(12) United States Patent
Hoewisch et al.

(10) Patent No.: US 11,871,214 B2
(45) Date of Patent: *Jan. 9, 2024

(54) TRAFFIC FLOW CONTROL USING DOMAIN NAME

(71) Applicant: Aeris Communications, Inc., San Jose, CA (US)

(72) Inventors: Ethan Hoewisch, San Jose, CA (US); Hyungho Kim, Cupertino, CA (US); Drew S. Johnson, San Jose, CA (US); David Hu, San Jose, CA (US); Dae Seong Kim, Campbell, CA (US); Michael Steven Maiten, Los Gatos, CA (US); Sundararaj Arunachalam, Naperville, IL (US)

(73) Assignee: Aeris Communications, Inc., San Jose, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/465,985

(22) Filed: Sep. 3, 2021

(65) Prior Publication Data

US 2021/0400535 A1    Dec. 23, 2021

Related U.S. Application Data

(63) Continuation-in-part of application No. 16/879,087, filed on May 20, 2020, now Pat. No. 11,115,378.

(Continued)

(51) Int. Cl.
*H04W 28/08* (2023.01)
*H04W 40/24* (2009.01)
(Continued)

(52) U.S. Cl.
CPC ..... *H04W 28/0992* (2020.05); *H04L 61/4552* (2022.05); *H04W 8/22* (2013.01);
(Continued)

(58) Field of Classification Search
CPC ......... H04W 28/0992; H04W 28/0925; H04W 8/22; H04W 8/26; H04W 40/248; H04L 61/4552; H04L 61/4511
See application file for complete search history.

(56) References Cited

U.S. PATENT DOCUMENTS 9,179,008 B2    11/2015  Goldner
9,942,252 B1     4/2018  Kondaveeti et al.
(Continued)

OTHER PUBLICATIONS

Bilge et al., Exposure: Finding Malicious DomainsUsing Passive DNS Analysis, Ndss, pp. 1-17, Feb. 6, 2011, Retrieved at https://sites.cs.ucsb.edu/~chris/research/doc/ndss11_exposure.pdf.
(Continued)

*Primary Examiner* — Azizul Choudhury
(74) *Attorney, Agent, or Firm* — Shih IP Law Group, PLLC

(57) ABSTRACT

A computer-implemented system and method for automated traffic flow control using domain name for one or more devices enabled for connectivity over cellular network are disclosed. The computer-implemented method for automated traffic flow control using domain name for one or more devices enabled for connectivity includes receiving device information for the one or more devices; receiving domain name information for at least one domain name that the one or more devices are allowed to access, denied to access or a combination thereof; associating the at least one domain name with one or more internet protocol (IP) addresses; monitoring the at least one domain for change in the one or more IP addresses for that domain; and updating the one or more IP addresses of the domain name if any change in the one or more IP addresses for that domain is found.

29 Claims, 17 Drawing Sheets

Related U.S. Application Data

(60) Provisional application No. 62/851,041, filed on May 21, 2019.

(51) Int. Cl.
    *H04W 8/22*      (2009.01)
    *H04W 8/26*      (2009.01)
    *H04L 61/4552*   (2022.01)
    *H04L 61/4511*   (2022.01)

(52) U.S. Cl.
    CPC ......... *H04W 8/26* (2013.01); *H04W 28/0925* (2020.05); *H04W 40/248* (2013.01); *H04L 61/4511* (2022.05)

(56) References Cited

U.S. PATENT DOCUMENTS

| | | | |
|---|---|---|---|
| 10,097,504 B2 | 10/2018 | Backholm | |
| 10,185,761 B2 | 1/2019 | Mahjoub | |
| 10,469,514 B2 | 11/2019 | Wang | |
| 2004/0228335 A1* | 11/2004 | Park | H04L 61/4511 370/352 |
| 2007/0299941 A1* | 12/2007 | Hietasarka | H04L 61/30 709/245 |
| 2009/0037976 A1* | 2/2009 | Teo | G06F 21/566 726/1 |
| 2014/0181248 A1* | 6/2014 | Deutsch | H04L 61/4511 709/217 |
| 2015/0188949 A1 | 7/2015 | Mahaffey | |
| 2016/0014082 A1 | 1/2016 | Bharali et al. | |
| 2018/0019968 A1 | 1/2018 | Redekop | |
| 2018/0367571 A1 | 12/2018 | Verma et al. | |
| 2019/0182211 A1* | 6/2019 | Yang | H04L 69/326 |

OTHER PUBLICATIONS

Antonakakis et al., Building a dynamic reputation system for DNS, USENIX security symposium, pp. 273-290, Aug. 11, 2010, Retrieved at https://www.usenix.org/legacy/event/sec10/tech/full_papers/Antonakakis.pdf.

Marchal et al., DNSSM: A large scale passive DNS security monitoring framework, 2012 IEEE Network Operations and Management Symposium, pp. 988-993, Apr. 16, 2012, Retrieved at https://hal.archives-ouvertes.fr/hal-00749243/file/dnssm.pdf.

Felegyhazi et al., On the Potential of Proactive Domain Blacklisting, LEET 10: 6-6, Apr. 27, 2010, Retrieved at https://www.usenix.org/legacy/event/leet1.

Yadav et al., Detecting algorithmically generated malicious domain names, Proceedings of the 10th ACM SIGCOMM conference on Internet measurement, pp. 48-61, Nov. 1, 2010, Retrieved at http://eprints.networks.imdea.org/67/1/Detecting_Algorithmically_Generated_Malicious_Domain_Names_-_2010_EN.pdf.

Rughani, Detecting blacklisted ip access from android phone, Indian Journal of Science and Technology 9, No. 48, Dec. 2016, trieved at https://pdfs.semanticscholar.org/9e79/38e81ec971a48aaf70fb08fbb4ff208e2ba8.pdf.

Heard et al., Filtering automated polling traffic in computer network flow data, 2014 IEEE Joint Intelligence and Security Informatics Conference, pp. 268-271, Sep. 24, 2014, Retrieved at https://spiral.imperial.ac.uk/bitstream/10044/1/54202/2/polling_paper.pdf.

International Search Report and Written Opinion from International Application No. PCT/US20/33778 dated Oct. 5, 2020, 9 pages.

* cited by examiner

An example system – Traffic Control Function

An example system – Generic Firewall

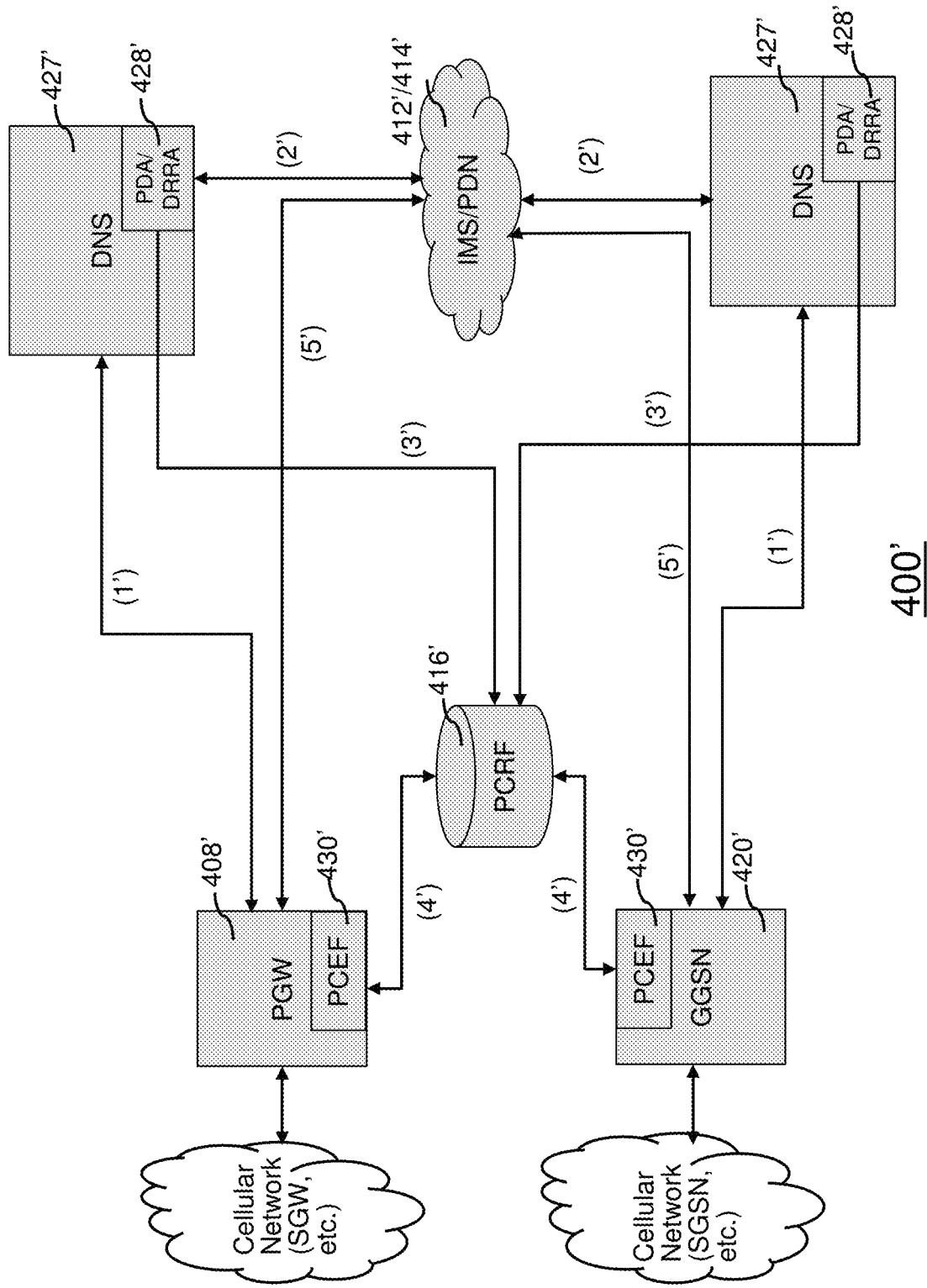

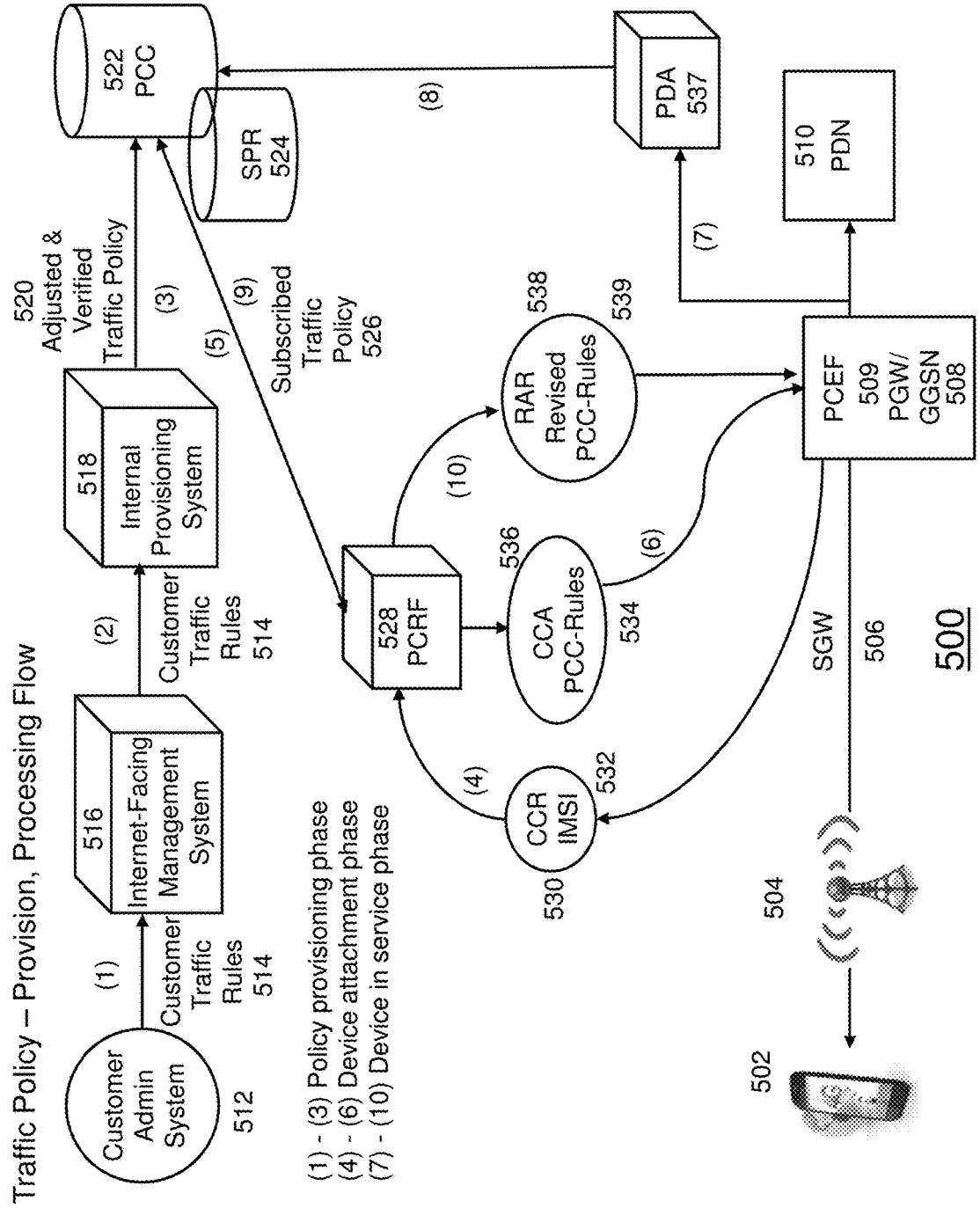

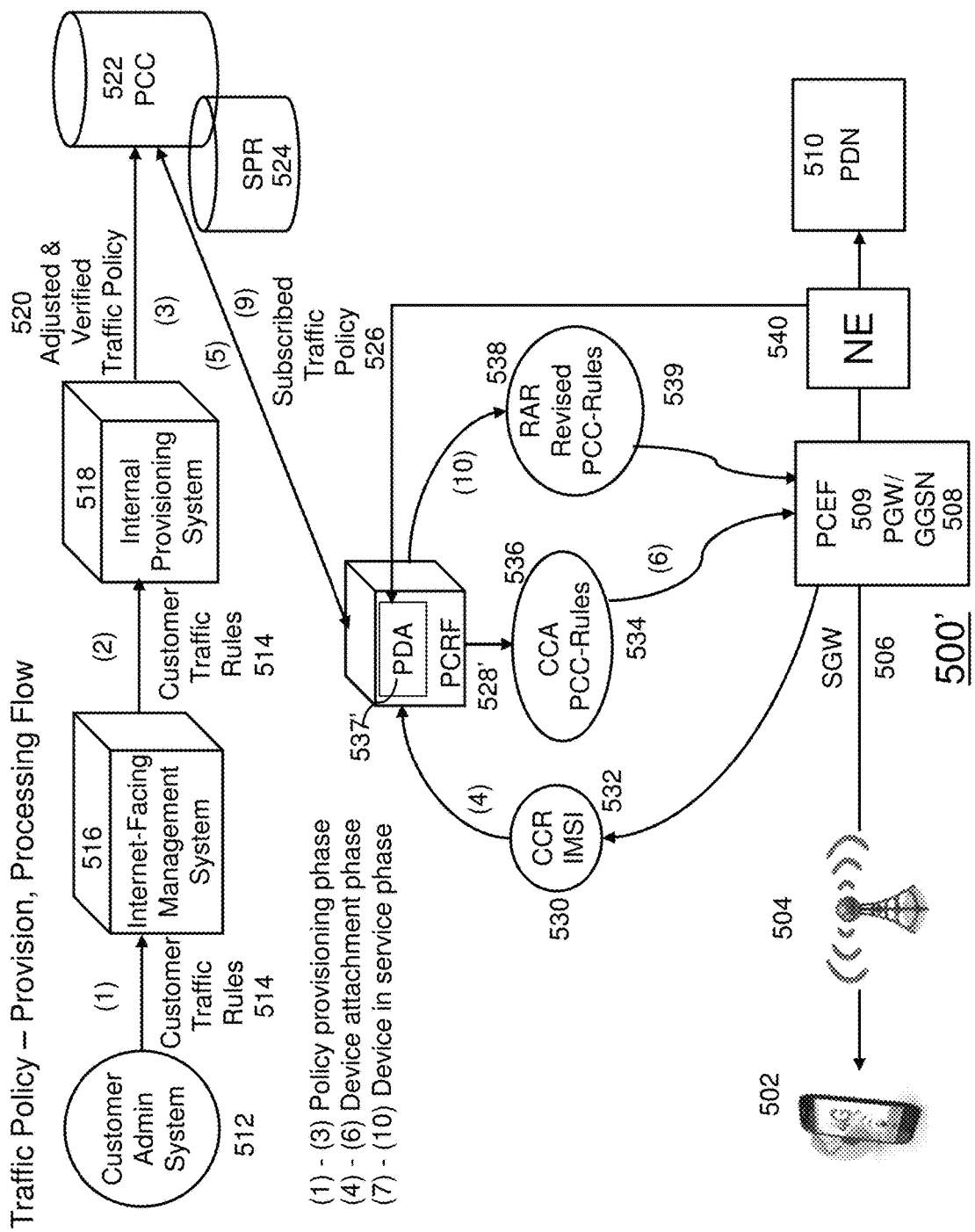

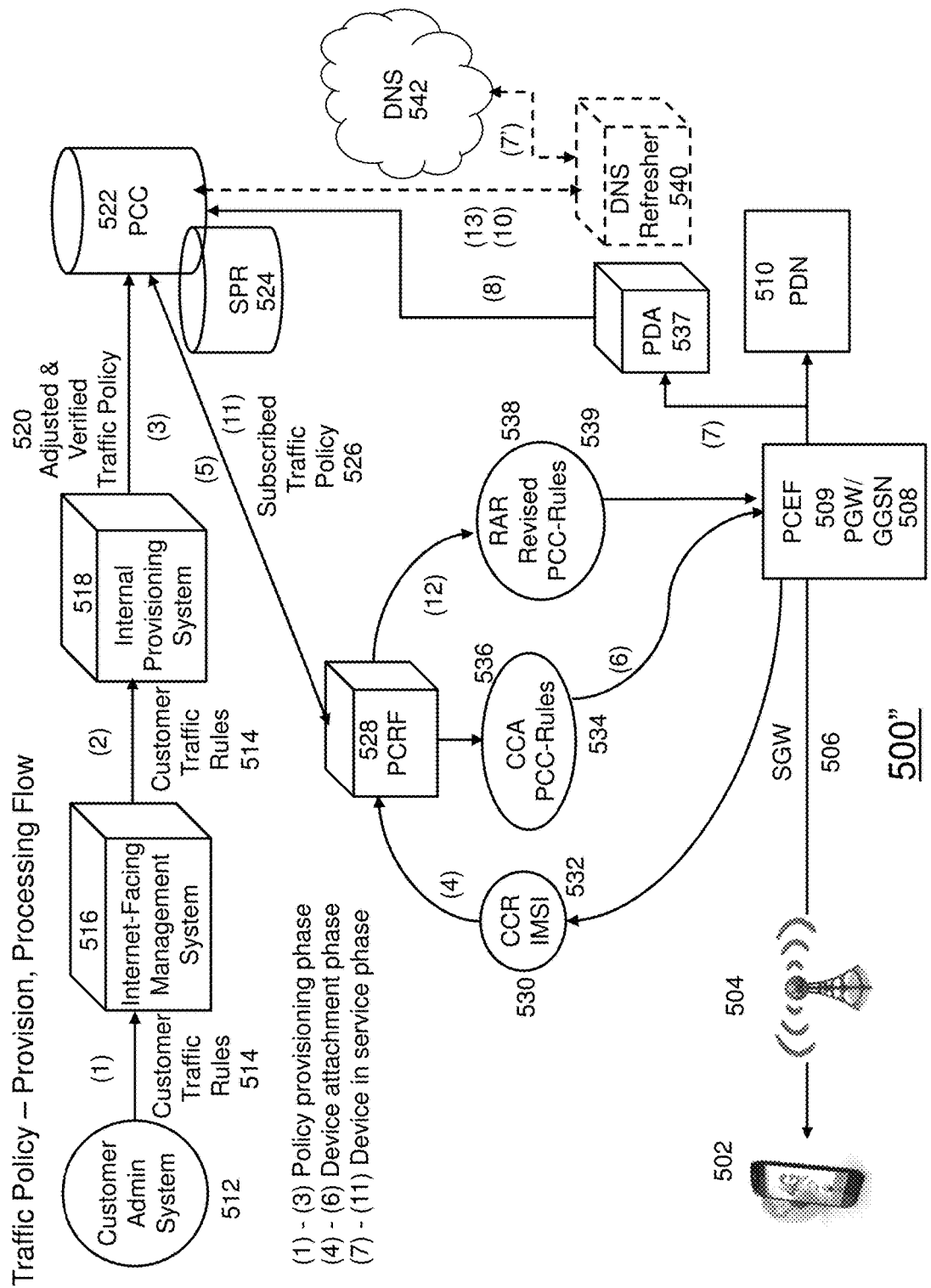

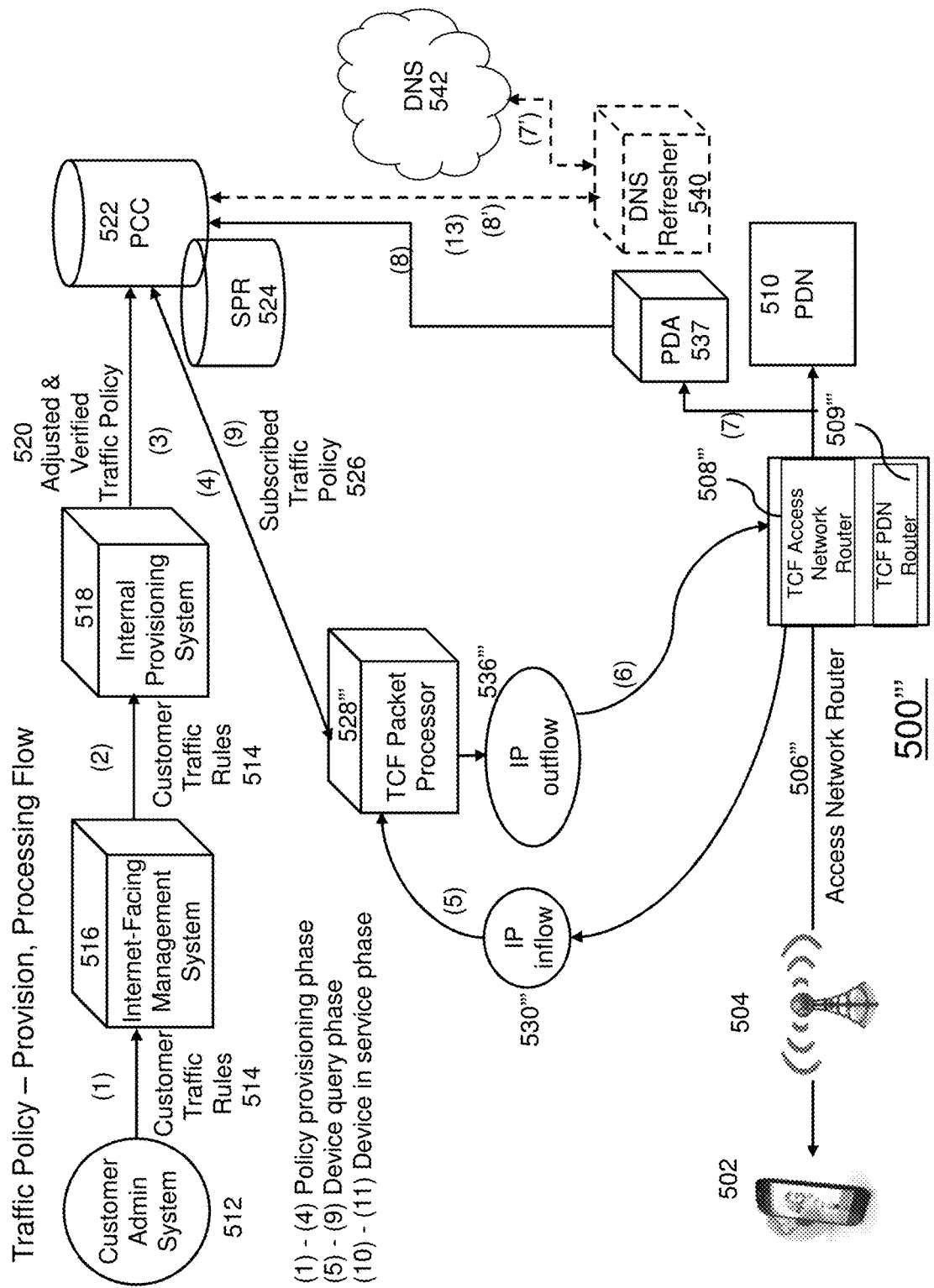

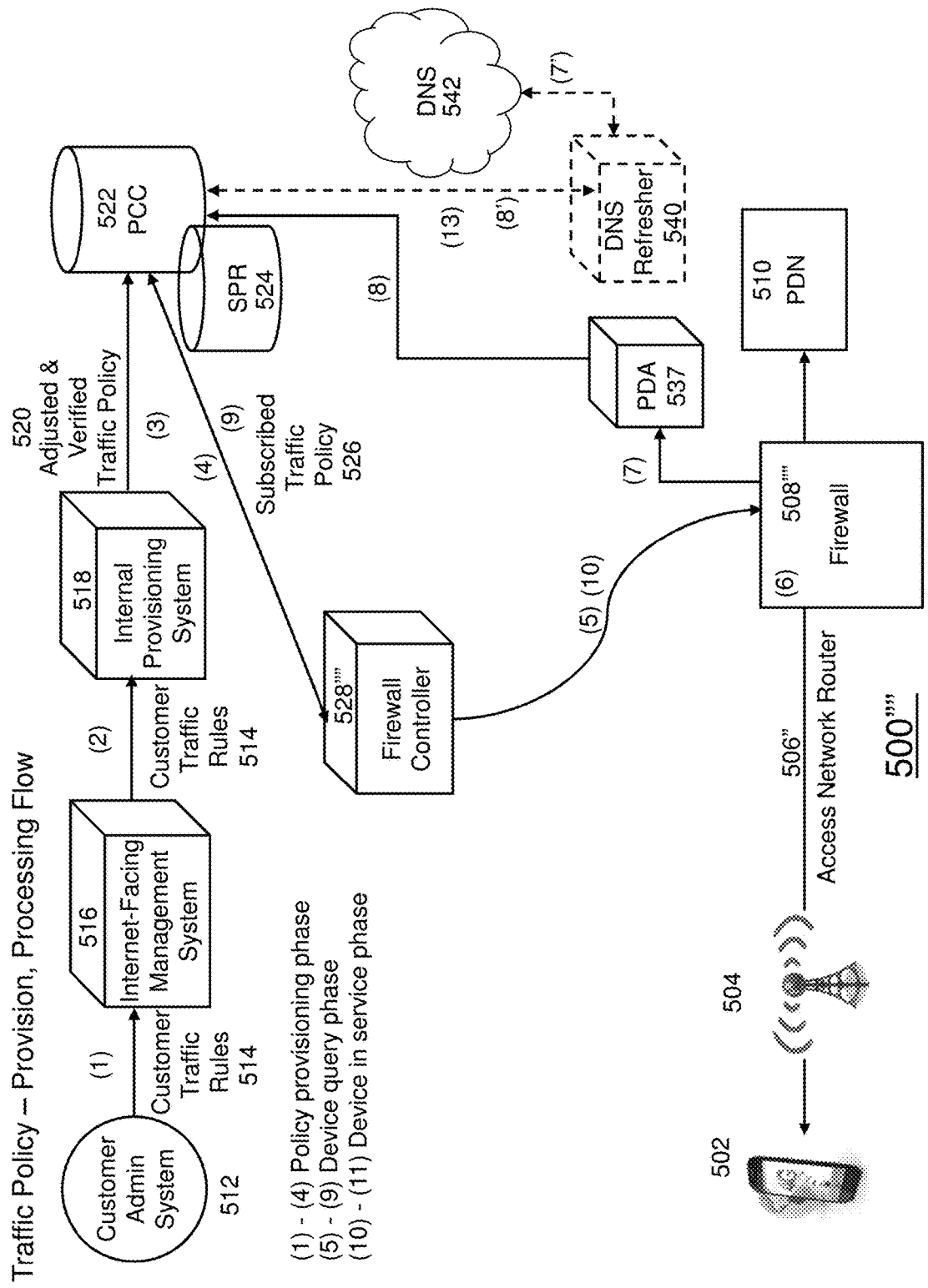

TRAFFIC FLOW CONTROL USING DOMAIN NAME

CROSS-REFERENCE TO RELATED APPLICATION

This application is a Continuation-In-Part of the U.S. application Ser. No. 16/879,087 filed May 20, 2020, which claims priority to U.S. provisional application No. 62/851,041, filed May 21, 2019, all of which are herein incorporated by reference in their entirety.

FIELD OF THE INVENTION

The present invention relates generally to controlling flow of traffic using domain names for devices using cellular or wireless connectivity.

BACKGROUND

An increasing number of devices, whether telematics equipment, sensors, tablets, phones or other types of hardware, known as machine-to-machine (M2M) or Internet of Things (IoT) devices, are enabled to connect to networks, such as wireless or cellular networks, for sending or receiving data for use with products such as Subscriber Identification Modules (SIMs). As IoT solutions are being deployed in high volume, and as concerns for the security of IoT solutions is increasing, the need and demand to limit the Internet Protocol (IP) addresses that the IoT devices can access on the network is becoming stronger. Allow-listing (traditionally used as whitelisting) or deny-listing (traditionally used as blacklisting) specific IP addresses is an accepted alternative for controlling access, but requires knowledge of, and continuous updating of, those addresses. Allow-listing or deny-listing a domain name, rather than specific IP addresses, may provide a simpler and better solution. However, as the IP addresses associated with a specific domain name may change over time, the possibility of errors in the application of these rules increases.

Accordingly, what is needed are systems and/or methods to address the above identified issues. The present invention addresses such a need.

SUMMARY

A computer-implemented system, method and computer program product for automated traffic flow control using domain names for one or more devices enabled for connectivity over cellular or wireless networks are disclosed. The computer-implemented method for automated traffic flow control using domain names for one or more devices enabled for connectivity over cellular or wireless networks includes receiving device information for the one or more devices; associating the device with a service profile specifying one or more domains that are allowed or disallowed for that device; receiving domain name information for at least one domain name that the one or more devices are allowed to access, denied to access or a combination thereof; associating the at least one domain name with one or more internet protocol (IP) addresses; monitoring the at least one domain for change in the one or more IP addresses for that domain; and updating the one or more IP addresses of the domain name if any change in the one or more IP addresses for that domain is found.

The system for automated traffic flow control using domain name comprises one or more devices enabled for connectivity, a traffic rule schema translator, a service profile stored with the traffic rule schema translator for devices enabled for connectivity that identifies domains that devices with that service profile are allowed to access, and a protocol data analyzer, wherein the traffic rule schema translator receives: device information for the one or more devices, domain name information for at least one domain name that the one or more devices are allowed to access, denied to access or a combination thereof; and wherein, if the traffic rule schema translator determines that the domain name is allowed for that device with that service profile, the protocol data analyzer associates the at least one domain name with one or more internet protocol (IP) addresses; monitors the at least one domain for change in the one or more IP addresses for that domain; and updates the one or more IP addresses of the domain name if any change in the one or more IP addresses for that domain is found.

In an embodiment, the computer program product for traffic flow control using domain name for one or more devices enabled for connectivity over cellular or wireless networks, having computer readable instructions for causing a computer to control an execution of an application for traffic flow control using domain name for one or more devices enabled for connectivity including receiving device information for the one or more devices; receiving domain name information for at least one domain name that the one or more devices are allowed to access, denied to access or a combination thereof; associating the at least one domain name with one or more internet protocol (IP) addresses; monitoring the at least one domain for change in the one or more IP addresses for that domain; and updating the one or more IP addresses of the domain name if any change in the one or more IP addresses for that domain is found.

BRIEF DESCRIPTION OF THE DRAWINGS

FIG. 4B illustrates an exemplary system 400' and process for automated traffic flow control using domain name for one or more devices enabled for connectivity over cellular or wireless network in accordance with an embodiment of the present invention.

FIG. 5A illustrates an exemplary system 500 and process for automated traffic flow control using domain name for one or more devices enabled for connectivity over cellular or wireless network in accordance with an embodiment of the present invention.

FIG. 5B illustrates an exemplary system 500' and process for automated traffic flow control using domain name for one or more devices enabled for connectivity over cellular or wireless network in accordance with an embodiment of the present invention.

FIG. 5C illustrates an exemplary system 500" and process for automated traffic flow control using domain name for one or more devices enabled for connectivity in accordance with one or more embodiments of the present invention.

FIG. 5D illustrates an exemplary system 500''' and process for automated traffic flow control using domain name for one or more devices enabled for connectivity in accordance with one or more embodiments of the present invention.

FIG. 5E illustrates an exemplary system 500'''' and process for automated traffic flow control using domain name for one or more devices enabled for connectivity in accordance with one or more embodiments of the present invention.

DETAILED DESCRIPTION

Figure 1:
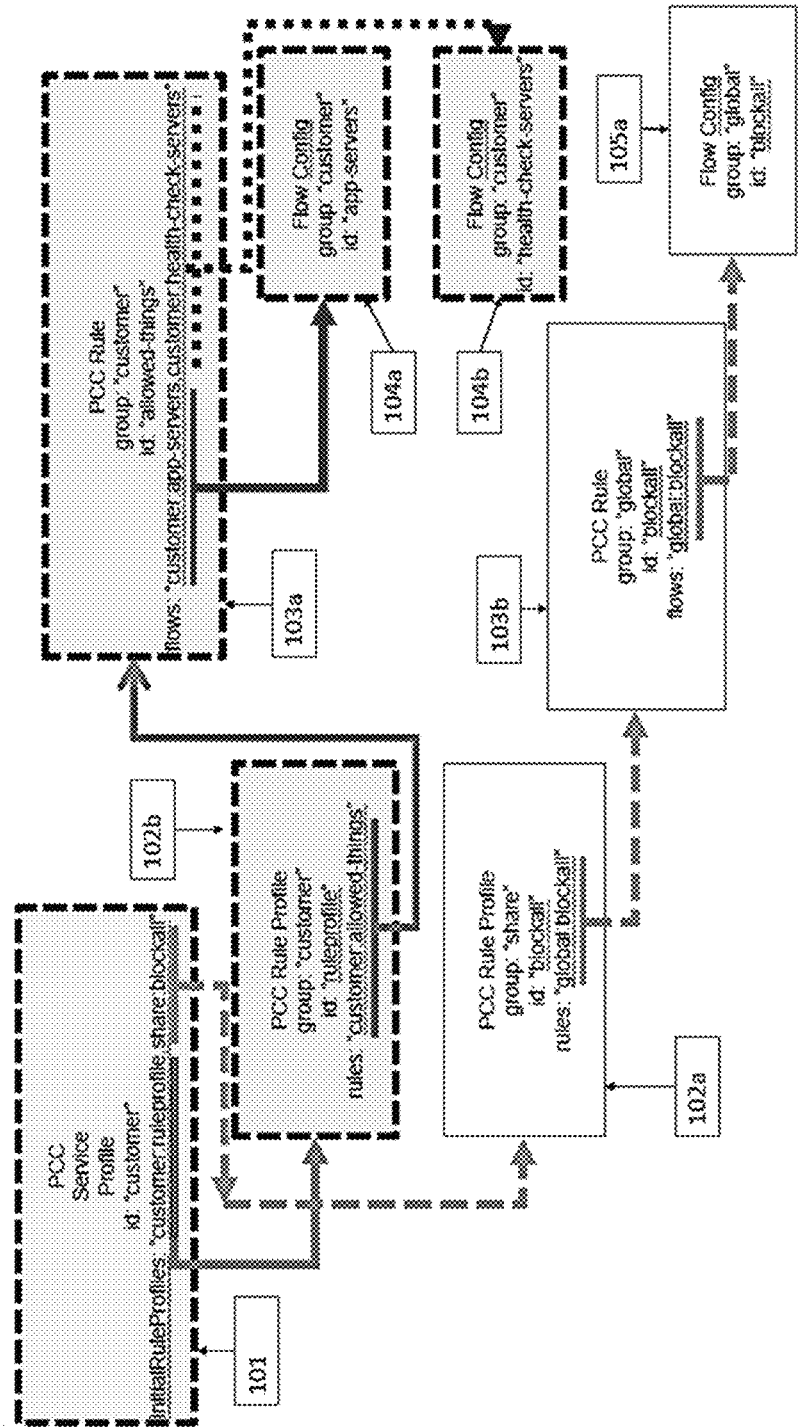
FIG. 1 illustrates an exemplary system 100 and process used for automated traffic flow control using domain name for one or more devices enabled for connectivity over cellular or wireless network in accordance with one or more embodiments of the present invention.

The present invention relates generally to controlling flow of traffic using domain names for devices using cellular or wireless connectivity.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Although the invention is described with respect to a product including a connectivity module such as a Subscriber Identification Module (SIM), as used herein the term "product" is intended to be inclusive, interchangeable, and/or synonymous with telematics equipment, sensors, appliances, electronic modules, telephony equipment and other similar products that are enabled for connectivity to wireless or cellular networks and that require registration for that product of distinct identifying numbers, such as Integrated Circuit Card Identifiers (ICCIDs), International Mobile Subscriber Identities (IMSIs), Mobile Equipment Identifiers (MEIDs) or other serial numbers as described further below and collectively referred to herein as "numbers", with a service provider to receive services, one will recognize that functionally different types of products may have characteristics, functions and/or operations which may be specific to their individual capabilities and/or deployment.

An increasing number of devices, whether telematics equipment, sensors, tablets, phones or other types of hardware, known as M2M or Internet of Things (IoT) devices, are enabled to connect to networks, such as wireless or cellular networks, for sending or receiving data by use of such products such as Subscriber Identification Modules (SIMs). As IoT solutions are being deployed in high volume, and as concerns for the security of IoT solutions is increasing, the need and demand to limit the IP addresses that the IoT devices can access on the network is becoming stronger.

One approach to limit the IP addresses that the IoT devices can access is to define a custom Access Point Name (APN) and policies at the Packet Gateway (P-GW) of a cellular network. A downside of this approach is that allowing access to each unique set of IP addresses requires a new APN and policies; defining these APNs and policies requires effort on the part of the operator of the P-GW and involves risk of misconfiguring the P-GW. An alternate approach is to employ a firewall between the P-GW and the Internet where the firewall can be configured with rules to match a cellular device's assigned IP address and the IP addresses that the cellular device is allowed to reach and/or access.

However, because each firewall rule would need to identify the cellular device it applies to, and because the sets of allowed IP addresses for each of the number of cellular devices on the network may be different, there may need to be thousands or millions of rules in the firewall at any time. Additionally, the network operator may assign IP addresses to cellular devices dynamically, such that, for example, a given cellular device may have one IP address when it establishes a packet data session at one time, and a different IP address when it establishes a packet data session at a different time. In this scenario, a rule for a cellular device in the firewall would have to be uninstalled, deactivated, or removed when that cellular device terminates its packet data session, in order for the network operator to safely re-assign the same IP address to another cellular device. Constantly adding and removing rules to the firewall would form an impressive overhead on the operation of the firewall.

An alternate approach is to use the entities specified by the Third Generation Partnership Project (3GPP). These entities are the Policy and Charging Rule Function (PCRF), also referred to herein as a traffic rule schema translator and Policy and Charging Enforcement Function (PCEF). 3GPP technical specification 29.212 defines how the PCRF can specify, for each cellular device, what IP addresses the cellular device is and is not allowed to access, effectively forming an allow list and a deny list of IP addresses. The PCEF then enforces the allow list and deny list. The PCEF may be implemented as a subsystem of the P-GW (LTE networks) or GGSN (GSM and WCDMA networks). Using the PCRF and PCEF functionalities in a cellular network lowers the operational effort and risk to the operator of the network.

An alternative approach is to use a traffic filtering/control function (TCF). In an embodiment, the TCF, for example, Aeris Packet Function (APF) associates IP packets with the subscriber who sent or will receive the IP packets, and associates the subscriber with a policy, in order to enforce a policy relevant to that subscriber. This allows the operator of the network to configure policies for groups of subscribers as service profiles and have the Aeris Packet Function (APF) perform the enforcement of those policies. Similar to a PCRF and PCEF, the TCF reduces the operational effort and risk to the operator of the network of enforcing such allow-lists and deny-lists. Additionally, the TCF such as Aeris Packet Function (APF) may also allow the method and system for controlling traffic using domain names in non-cellular network access technologies such as WiFi or Ethernet. The traffic control function, illustrated herein as Aeris Packet Function (APF) is described in detail in co-pending and co-owned U.S. provisional application No. 63/166,492, filed Mar. 26, 2021, entitled METHOD AND SYSTEM FOR DEFINING AND ENFORCING IP TRAFFIC POLICY FOR CONNECTED DEVICES and is incorporated herein by reference in its entirety.

In an embodiment, a firewall may be employed in combination with a network assigned unique identifier management service (NAUIMS) or an IP Address Management System (IPMS) and a control element also described herein as traffic rule schema translator, for example, firewall controller, working in combination with the firewall in order to stabilize the assignment of IP addresses to devices and minimize the number of unique rules in the firewall. For example, if a device will have the same IP address in all of its data sessions, rules in the firewall will not have to be deleted when a device's data session is torn down.

The NAUIMS or IPMS assigns a range of network assigned unique identifiers to a service profile; associates at least one device with one of the range of network assigned unique identifiers assigned to the service profile using communication network subscription identifier for the at least one device; and defines traffic policy rules for the service profile. The NAUIMS and IPMS are described in detail in co-pending and co-owned U.S. provisional application No. 63/166,492, filed Mar. 26, 2021, entitled METHOD AND SYSTEM FOR DEFINING AND ENFORCING IP TRAFFIC POLICY FOR CONNECTED DEVICES which is incorporated herein by reference in its entirety.

Additionally, or alternatively, a traffic rule schema translator, for example, a firewall controller, may be employed to revise the configuration of the firewall whenever the sets of allowed IP addresses for each of the number of cellular devices on the network are revised to eliminate operator intervention.

With the proper mechanism for storing the mapping of what cellular device is allowed to access what IP addresses, the operator of the network can even allow their customers to specify their own allowed or allow-listed IP addresses through, for example, a web portal.

However, consider the case where a cellular device communicates with a service running on a host with an IP address, and that the cellular device has been allowed to access that IP address. If the service stops running on that first host, and starts running on a second host with a second IP address, the cellular device will need to be allowed to access that second IP address. Allow-listing or deny-listing a domain name, rather than specific IP addresses, may provide a simpler and better solution, because it introduces a level of indirection: the operator of a cellular device may configure the cellular device to determine the IP address of the service with which it needs to communicate by using the Domain Name System (DNS), and the PCRF may determine what IP address to allow-list or deny-list by also using DNS. However, as the IP addresses associated with a specific domain name may change over time, the possibility of errors in the application of these rules increases. A domain name described herein may be defined as any name when resolved through a domain name system that results in an IP address.

Generally, the PCRF is designed to control access of and actions by IoT devices based on their service profile. For example, the PCRF can allow packet data transmission, cause a packet data session to drop, assign a charging code to traffic, and/or apply a Quality of Service policy. These actions are similar to the actions firewalls may take. Another rule that can be enforced by the PCRF is allow-listing or deny-listing traffic. Allow-listing may include: allowing a device to communicate with a limited set of IP addresses or ports only, and denying everything else. For example, devices intended for specific use and not for general access to the Internet could be assigned a service profile limiting endpoints that can be reached, enforced through the PCRF, that would prevent workers from accessing anything but work websites, or that would require a temperature sensor to send data to only one IP address. Deny-listing traffic may include: preventing a device from accessing a specified set of IP addresses or ports and allowing everything else, or blocking 128.0.0.0/1 and allowing everything else. A PCRF can be configured to apply special traffic charging rules to devices having a specific service profile, such as applying specific rules for specific scenarios, for example, not counting data packets associated with traffic to or from a specific IP address against a subscriber's data plan.

However, basing allow-listing or deny-listing rule functions on specific IP addresses is not well suited for situations where the whitelisted endpoint is a web site or web application, as many websites use external resources and subdomains, and learning and applying additional filter rules for access to such sites' external resources, subdomains, etc. could potentially require a lot of work. Furthermore, the IP addresses associated with allow-listed endpoints frequently change. Updating IP addresses manually is cost-prohibitive and may produce results that are error prone.

The application of 3GPP technical spec. 29.212 (Policy and Charging Control (PCC) over Gx reference point) is capable of allow-listing the IP addresses (or ranges of addresses) reachable by a cellular device, and deny-listing any other IP addresses not allow-listed. The cellular device will be able to communicate with the allow-listed IP addresses, and will not be allowed to communicate with any addresses other than the allow-listed addresses and/or the deny-listed IP addresses. This whitelisting (a Connection Lock) is most appropriate in the following exemplary situations where the customer's application needs to talk to a small set of IP addresses and these IP addresses do not change, there is concern that a hacker could attempt to take over the device and cause it to send traffic to a new IP address, or there is customer concern that the SIM will be removed from the intended device and used for general purpose Internet access, resulting in unplanned and undesirable usage charges.

Although the embodiments described herein are generally described in terms of allow-listing certain domain names and/or IP addresses, it may also be practiced using deny-list certain domain names and/or IP addresses and would be within the scope of the invention.

The Policy and Charging Rules Function (PCRF) and Policy and Charging Enforcement Function (PCEF) are two different functional entities which may or may not be part of the same computer program product. For example, a network operator could write a program that fulfils the functionality of both creating policies and enforcing them, but it would be monolithic, or the network operator could write different programs wherein one fulfils the functionality of creating policies and another fulfils the functionality of enforcing them. In an exemplary implementation, the PCRF communicates over a computer network to the PCEF what policy, for example, allow-listing, deny-listing, etc., should be applied to a certain cellular device.

The network provider may implement the PCRF to store in a database a service profile for a set of cellular devices, which service profile lists the IP addresses to be allow-listed or deny-listed for those devices, and configure the PCRF to consult the service profile and the data in this database to determine what actions to take and rules to apply for each IP packet observed by the PCRF as being from or to one such cellular device. If the service profile permits access to an IP address or range of IP addresses, those IP addresses are said to be allow-listed.

To reduce unwanted data billing and to mitigate security issues, customers may want to limit the Internet destinations with which customer devices can communicate to a specific set of allow-listed destinations. Currently, that can be done via Virtual Private Network (VPN) integration or IP-address-based allow-listing through a service profile stored in and applied by the PCRF. However, managing VPNs can require resources, and IP-address-based allow-listing through the PCRF may not be flexible enough. In addition, personnel entering permitted destinations in a service profile must know the exact numeric IP addresses for those destinations, which both introduces the opportunity for error on manual entry and makes review of policy rules less intuitive, since the numeric IP addresses do not visually display the name of a permitted or prohibited destination. Allow-listing based on hostname, such as a Uniform Resource Locator (URL) web address, may provide additional flexibility and simplicity.

To enable traffic control through use of a domain name, the service profile of a device stored in the PCRF can list either the domain name, the numeric IP address associated with that device, or both, of the destination to be allowed or denied for that device; the PCRF would apply the rules for allowing or blocking traffic using the actual IP address following the 3GPP technical spec. 29.212. If the domain name is stored in the service profile but the numeric IP address is not, the PCRF can perform its own DNS query to resolve the domain name to a numeric IP address. The specific numeric IP addresses associated with domain names may frequently change, however, which could result in unsuccessful connection attempts if the IP address associated with a host name in the PCRF, and, by virtue of the rule installation procedure, the PCEF, is no longer correct. The embodiments presented by this invention ensure that the specific numeric IP address or addresses associated with domain names are kept up-to-date.

Installing a sniffer or a packet data analyzer in an environment controlled by the network provider may be used to find out if there has been a change in one or more IP addresses associated with a domain name using domain name system (DNS) look up. The packet data analyzer can be configured automatically to update the allowed (allow-listed) or forbidden (deny-listed) IP address or IP addresses in the service profile for that device in the PCRF. The network operator may host her own DNS servers and direct cellular devices to use those DNS servers through, for example, the Dynamic Host Configuration Protocol (DHCP). The operators of those cellular devices may program the cellular devices to use the DNS servers advertised by the network operator through, for example, DHCP, or any other DNS server reachable by the cellular device. Because the packet data analyzer can intercept and read the DNS lookups of all cellular devices managed by the network operator regardless of the destination of the DNS lookup, the packet data can ensure that the results are correct, for example, the revised allow-listed IP addresses in the PCRF's service profile match the IP addresses that the cellular device will try to reach. Because the network provider's DNS servers would be resistant to common techniques used by malevolent actors trying to trick devices into visiting unwanted IP addresses, such as spoofing or cache poisoning, using the DNS servers could provide additional security.

An embodiment of this invention may include outputs to enable periodic or regular auditing and monitoring by network provider personnel, such as logs.

Figure 4A:
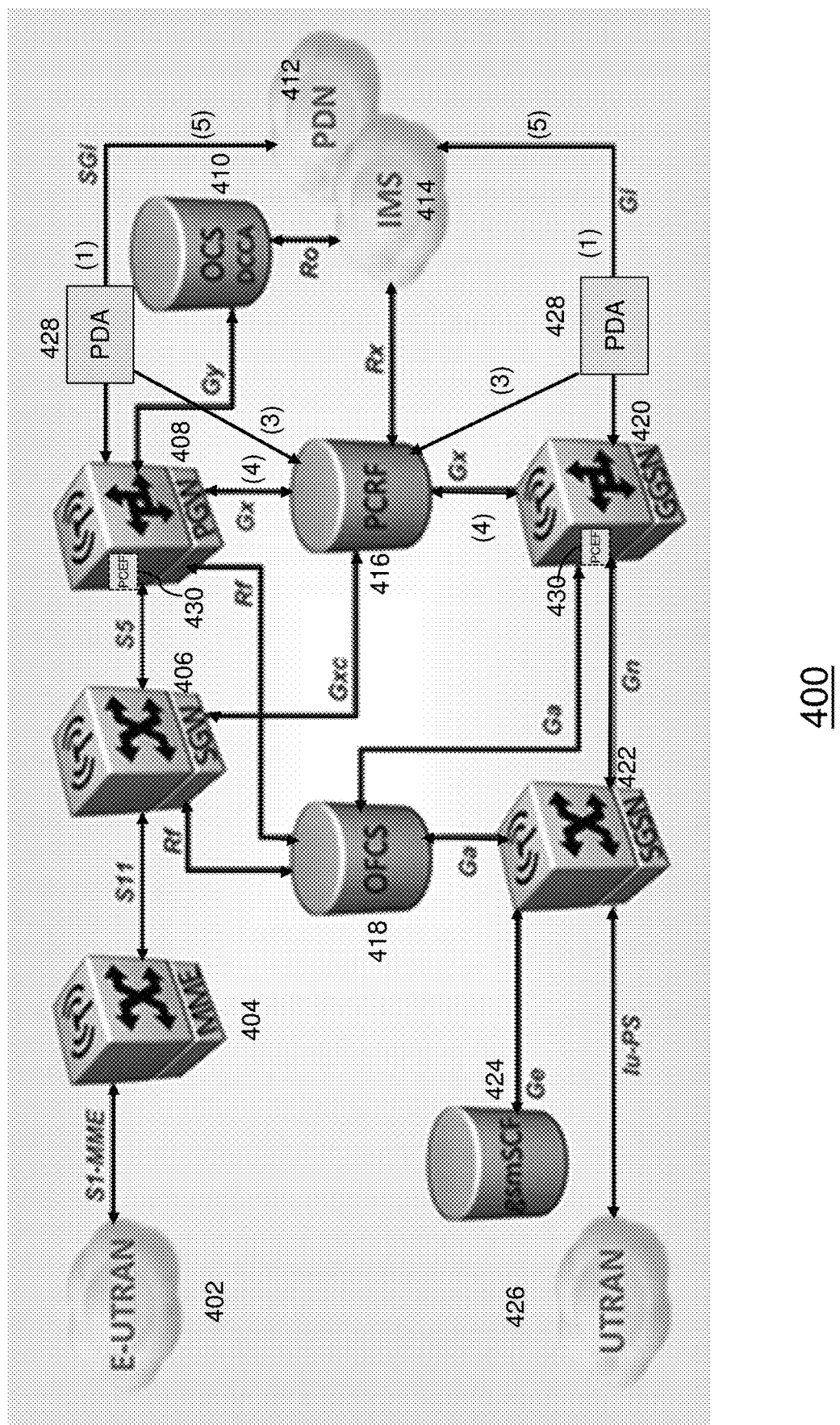
FIG. 4A illustrates an exemplary system 400 and process for automated traffic flow control using domain name for one or more devices enabled for connectivity over cellular or wireless network in accordance with an embodiment of the present invention.
Figure 4C:
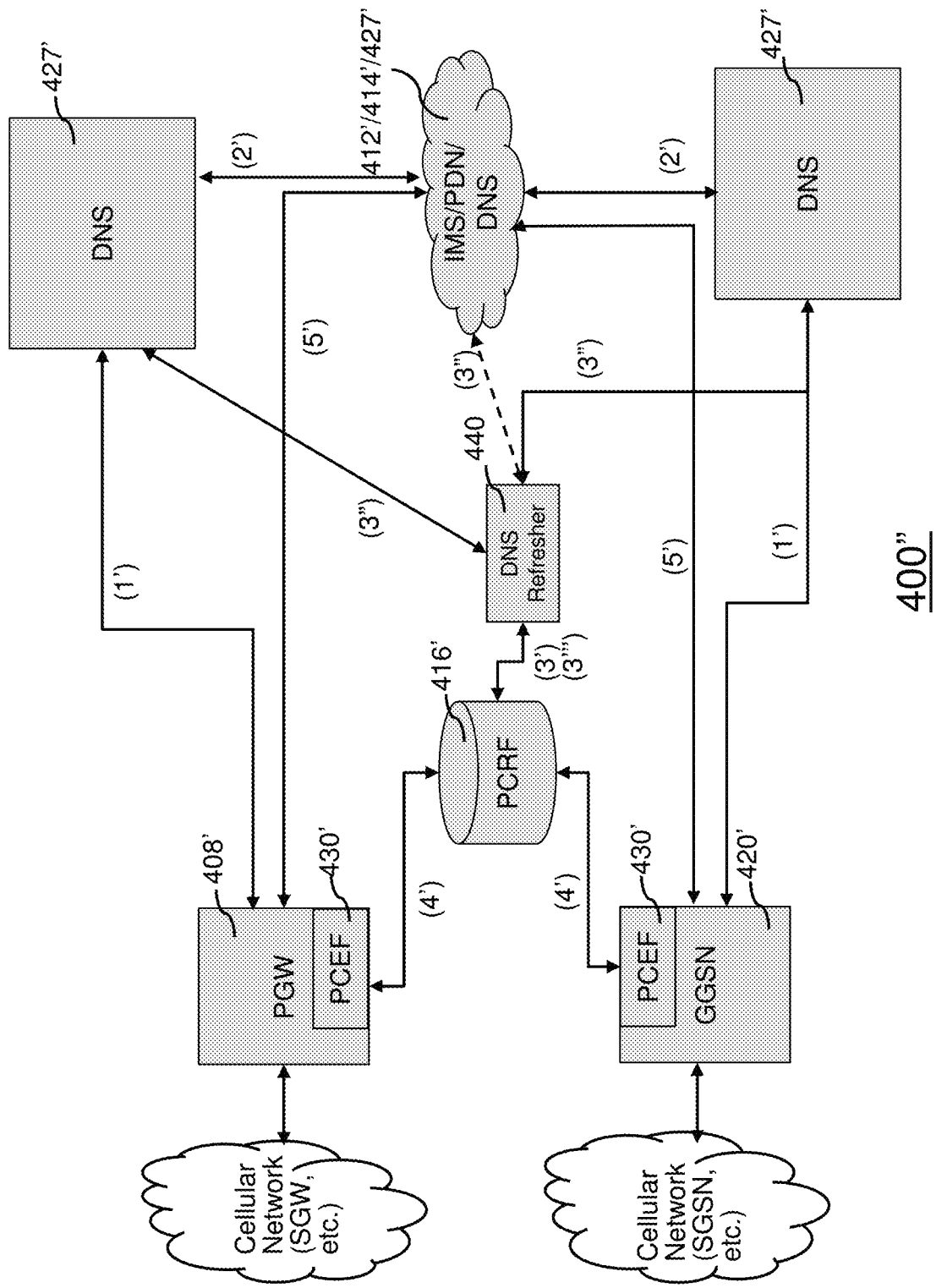
FIG. 4C illustrates an exemplary system 400" and process for automated traffic flow control using domain name for one or more devices enabled for IP connectivity over a network in accordance with one or more embodiments of the present invention.
Figure 4D:
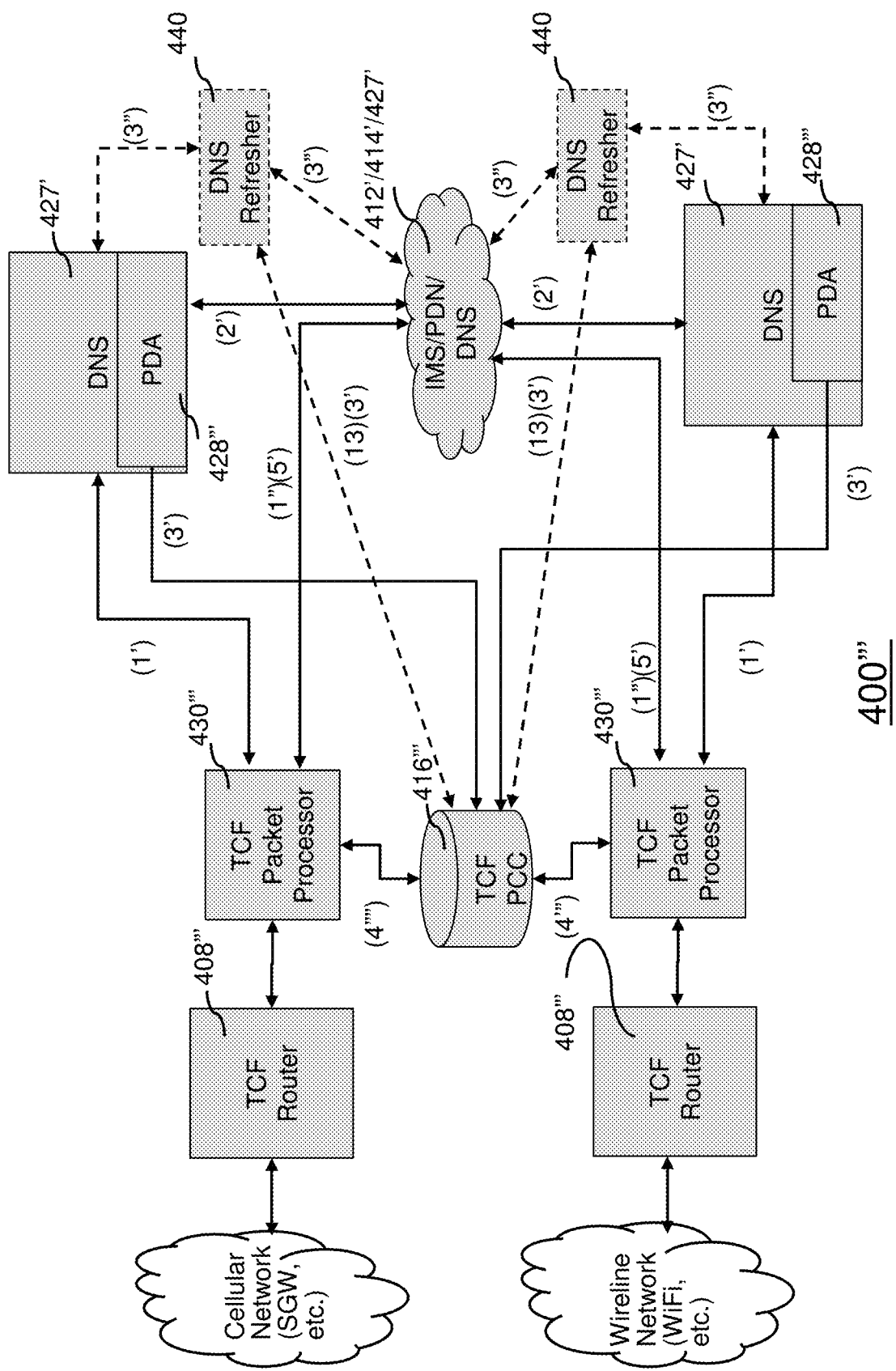
FIG. 4D illustrates an exemplary system 400''' and process for automated traffic flow control using domain name for one or more devices enabled for connectivity over cellular or wireless network in accordance with one or more embodiments of the present invention.
Figure 4E:
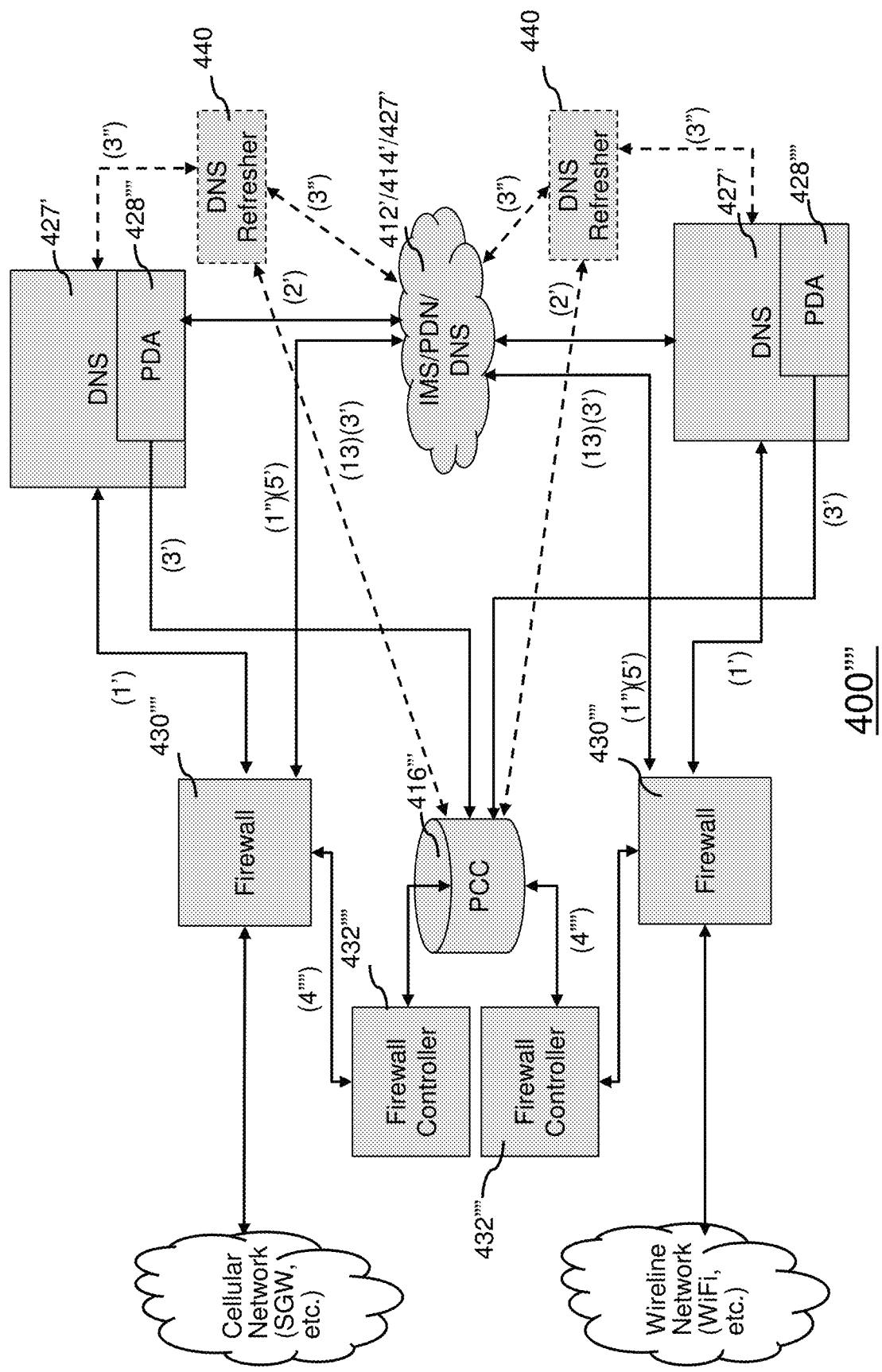
FIG. 4E illustrates an exemplary system 400'''' and process for automated traffic flow control using domain name for one or more devices enabled for connectivity over cellular or wireless network in accordance with one or more embodiments of the present invention.

The embodiments described herein may be used in concert with the DNS server provided by the network operator or another entity as follows, for example, Table 1:

| DNS query destination | DNS queries use encryption | Which embodiments of this invention are effective? |
|---|---|---|
| Network Operator's DNS server | No | 4A, 4B, 4C, 4D, 4E |
| Network Operator's DNS server | Yes | The network operator's DNS server will be trusted by the subscriber as illustrated by Figures 4B, 4D, and 4E |
| Other DNS server | No | The PDA as illustrated by Figure 4A would be configured to collect the DNS requests and responses for third party DNS servers. The DNS Refresher as illustrated by Figure 4C would be able to use, for example, recursive queries to indirectly query the other DNS server |
| Other DNS server | Yes | 4C |

An exemplary implementation of this invention would incorporate the packet data analyzer into the DNS servers run by the network operator. If the cellular devices use encryption (e.g., DNS-over-TLS or DNS-over-HTTPS) to enhance the confidentiality or integrity of their DNS lookups, the packet data analyzer could take the form of, for example, a function, method, or procedure invoked by the program of the DNS server: whenever the DNS server receives an answer to a DNS query, it can inform the packet data analyzer of the result by invoking the packet data analyzer. If any discrepancy in the IP address or IP addresses associated with a domain name is/are found, the IP address or IP addresses for that domain name is updated automatically and is kept up-to-date in network provider's database so that it is in sync with the actual IP address for that domain name. This continuous update of IP address or IP addresses for a particular domain name will allow the customers to set up allow-lists/deny-lists based on domain name rather than IP address or IP addresses. As an example, no restrictions may allow traffic to/from any destination; allow-listing <ipchicken.com> and <aeris.com> will allow traffic to <ipchicken.com> and <aeris.com> to pass and block traffic to any other destination; deny-listing <facebook.com> will block traffic to <facebook.com> and allow traffic to any other destination to pass.

To describe the features of the present invention in more detail within the context of IoT devices enabled to connect with wireless or cellular networks with products such as SIMs installed in them, such as telematics devices installed in vehicles or sensors, refer to the accompanying figures in conjunction with the following discussions. These examples are used for purpose of illustration only, and should not be construed as limitations.

The embodiments described herein disclose a computer-implemented method and system for automated traffic flow control using domain name for one or more devices enabled for connectivity over cellular or wireless networks.

A computer-implemented system, method and computer program product for automated traffic flow control using domain name for one or more devices enabled for connectivity over cellular or wireless networks are disclosed.

The computer-implemented method for automated traffic flow control using domain name for one or more devices enabled for connectivity over cellular or wireless networks includes receiving device information for the one or more devices; receiving domain name information for at least one domain name to which the one or more devices is attempting to access, associating the one or more devices with a service profile listing the domain names that such devices are allowed to access; associating the at least one domain name with one or more internet protocol (IP) addresses; monitoring the at least one domain for change in the one or more IP addresses for that domain; and updating the one or more IP addresses of the domain name if any change in the one or more IP addresses for that domain is found.

The system for automated traffic flow control using domain name comprises one or more devices enabled for connectivity, a traffic rule schema translator, and a protocol data analyzer, wherein the traffic rule schema translator receives: device information for the one or more devices, domain name information for at least one domain name which the one or more devices is attempting to access, associating the one or more devices with a service profile stored in the traffic rule schema translator listing the domain names that the one or more devices are allowed to access; and wherein the packet data analyzer associates the at least one domain name with one or more internet protocol (IP) addresses; monitors the at least one domain for change in the one or more IP addresses for that domain; and updates the one or more IP addresses of the domain name if any change in the IP address for that domain is found.

In an embodiment, the computer program product for traffic flow control using domain name for one or more devices enabled for connectivity over cellular or wireless networks, having computer readable instructions for causing a computer to control an execution of an application for traffic flow control using domain name for one or more devices enabled for connectivity including receiving device information for the one or more devices; receiving domain name information for at least one domain name that the one or more devices are allowed to access; associating the at least one domain name with one or more internet protocol (IP) addresses; monitoring the at least one domain for change in the one or more IP addresses for that domain; and updating the one or more IP addresses of the domain name if any change in the one or more IP addresses for that domain is found.

FIG. 1 illustrates an exemplary system 100 and process used for automated traffic flow control using domain name for one or more devices enabled for connectivity in accordance with one or more embodiments of the present invention. In an embodiment, the PCRF entities are linked together by their "group" and "id" fields as shown in FIG. 1. These links function like "foreign keys" in a relational database. When a subscriber requests a data session, the PCRF will follow these linkages to assemble the rules to form the subscriber's traffic rules. The illustration illustrates these linkages. For example, when the PCRF processes the request for a subscriber's data session, it examines the Policy and Charging Control (PCC) Service Profile 101 associated with the subscriber. The PCRF loads from a data store the PCC Rule Profiles 102a and 102b associated with PCC Service Profile 101; loads from a data store the PCC Rules 103a and 103b associated with PCC Rule Profiles 102a and 102b; loads from a data store the Flow Configs 104a, 104b and 105a associated with the PCC Rules 103a and 103b; creates a charging rule object from the flow information present in the Flow Configs 104a and 104b and rule information contained in PCC Rule 103a; creates a charging rule object from the flow information present in Flow Config 105a and PCC Rule 103b; and uses these charging rule objects to enforce the configured traffic policy.

Figure 2A:
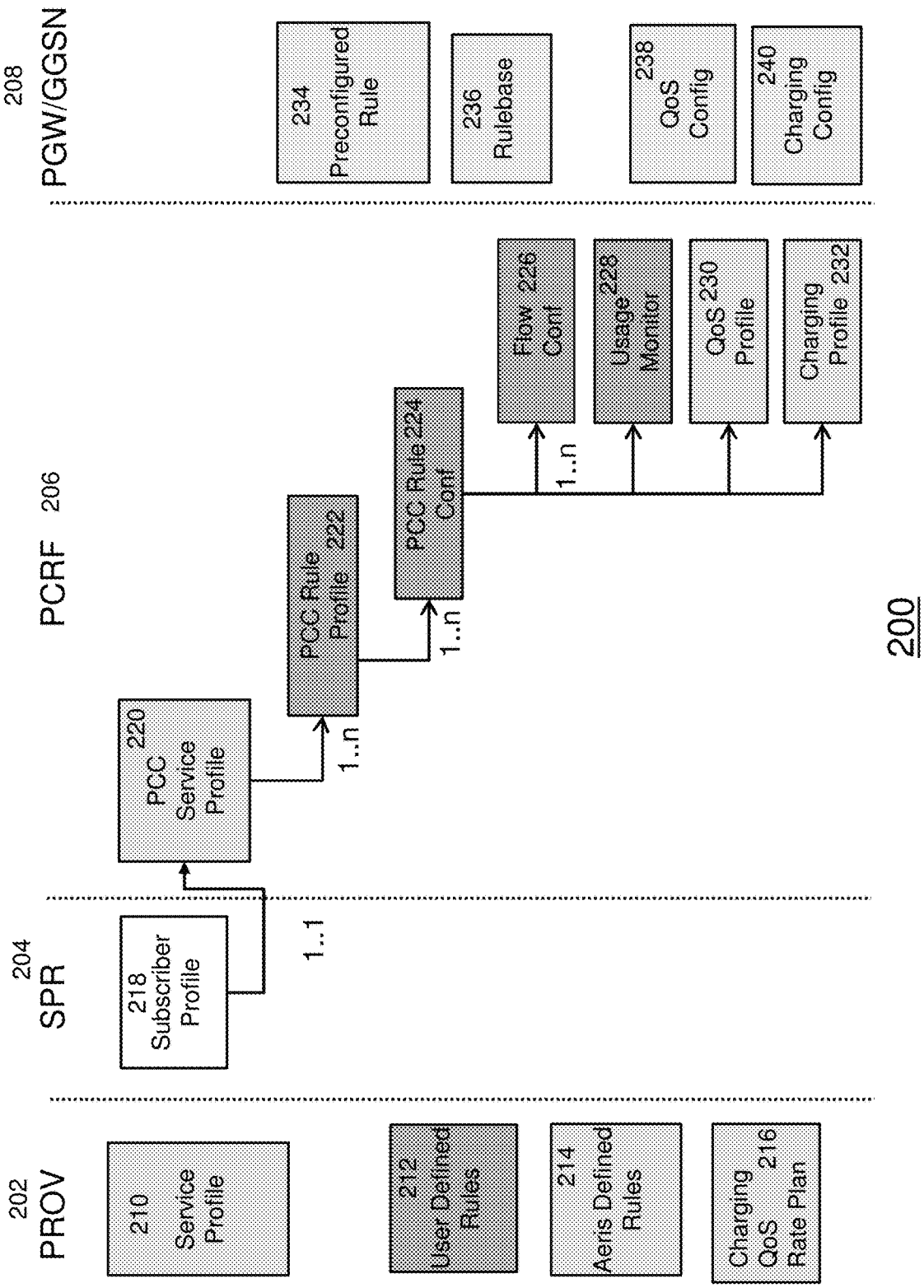
FIG. 2A illustrates an exemplary system 200 and process for automated traffic flow control using domain name for one or more devices enabled for connectivity over cellular or wireless network in accordance with an embodiment of the present invention.

FIG. 2A illustrates an exemplary system and process 200 for automated traffic flow control using domain name for one or more devices enabled for connectivity over cellular or wireless network in accordance with an embodiment of the present invention. In an embodiment, a Policy and Charging Control (PCC) rule 224 consists of: rule name (used as identifier w/Policy and Charging Rules Enforcement Function (PCEF)), service identifier (identify the service or the service component the service data flow relates to), service data flow filter(s) (select the traffic for which the rule applies), precedence (select rule in case more than one rule applies), gate status (allow/block packet uplink/downlink), QoS parameters (bitrates, allocation/retention, etc.), charging key (i.e. rating group), other charging parameters (online, offline, etc.) and monitoring key (for usage monitoring).

The policy entity or PCRF 206 assembles a Policy and Charging Control rule 224 from objects including PCC Service Profile (service_profile) 220, PCC rule profile (rule_profile) 222, PCC rule configuration (rule_conf) 224, flow configuration (flow_conf) 226, quality of service profile (qos_profile) 230, charging profile (charging_profile) 232, usage monitor (usage_monitor) 228 and subscriber profile (subs_profile) 218. The PCC Service Profile (service_profile) 220 forms a PCC policy including one or more rule profile (rule_profile) objects.

The rule profile (rule_profile) objects form a rule profile which provides what rules will apply and at what time of day they will apply. The rule configuration (rule_conf) 224 provides the actions, e.g., drop traffic, apply charging & QoS & monitoring, etc., that will be taken on a packet if the flow configuration (flow_conf) 226 describes the packet.

The flow configuration (flow_conf) 226 provides how to identify traffic based on packet header information, for example, network and user-equipment IP address, network and user-equipment port, protocol, and direction, e.g., to the User Equipment, from the User Equipment, or both, etc. The quality of service profile (qos_profile) 230 provides Quality of Service attributes such as maximum bitrate, guaranteed bitrate, qos class, etc.

The charging profile (charging_profile) 232 describes how this service flow, e.g., the traffic categorized by the flow configuration (flow_confs) 226, gets charged (for example, when the PCEF gets a packet, the information that goes in the charging records sent to the offline charging system (OfCS) or online charging system (OCS) systems).

The usage monitor (usage_monitor) 228 defines monitoring information for a device's traffic and subscriber profile (subs_profile) 218 maps a PCC policy to a user equipment (UE). Out of these, generally service profile (service_profile) 220, rule profile (rule_profile) 220, rule configuration (rule_conf) 224, flow configuration (flow_conf) 226 and subscriber profile (subs_profile) 218 are used for deny-listing/allow-listing IP addresses and/or ports.

The Policy and Charging Rules Function (PCRF) 206 and Policy and Charging Enforcement Function (PCEF) are two different functional entities which may or may not be part of the same computer program product. In an exemplary implementation, the PCRF 206 communicates over a computer network to the PCEF what policy (deny-listing, allow-listing, etc.) should be applied to a certain cellular device. The PCEF may be implemented as a sub-module of PCRF 206 or as a sub-module of PGW (LTE networks) or (GSM and WCDMA networks) 208.

Although a number of examples of filters and/or attributes for creating groups are provided herein, various other attributes may be used for creation of groups based on various attributes and would be within the scope of the invention.

Figure 2B:
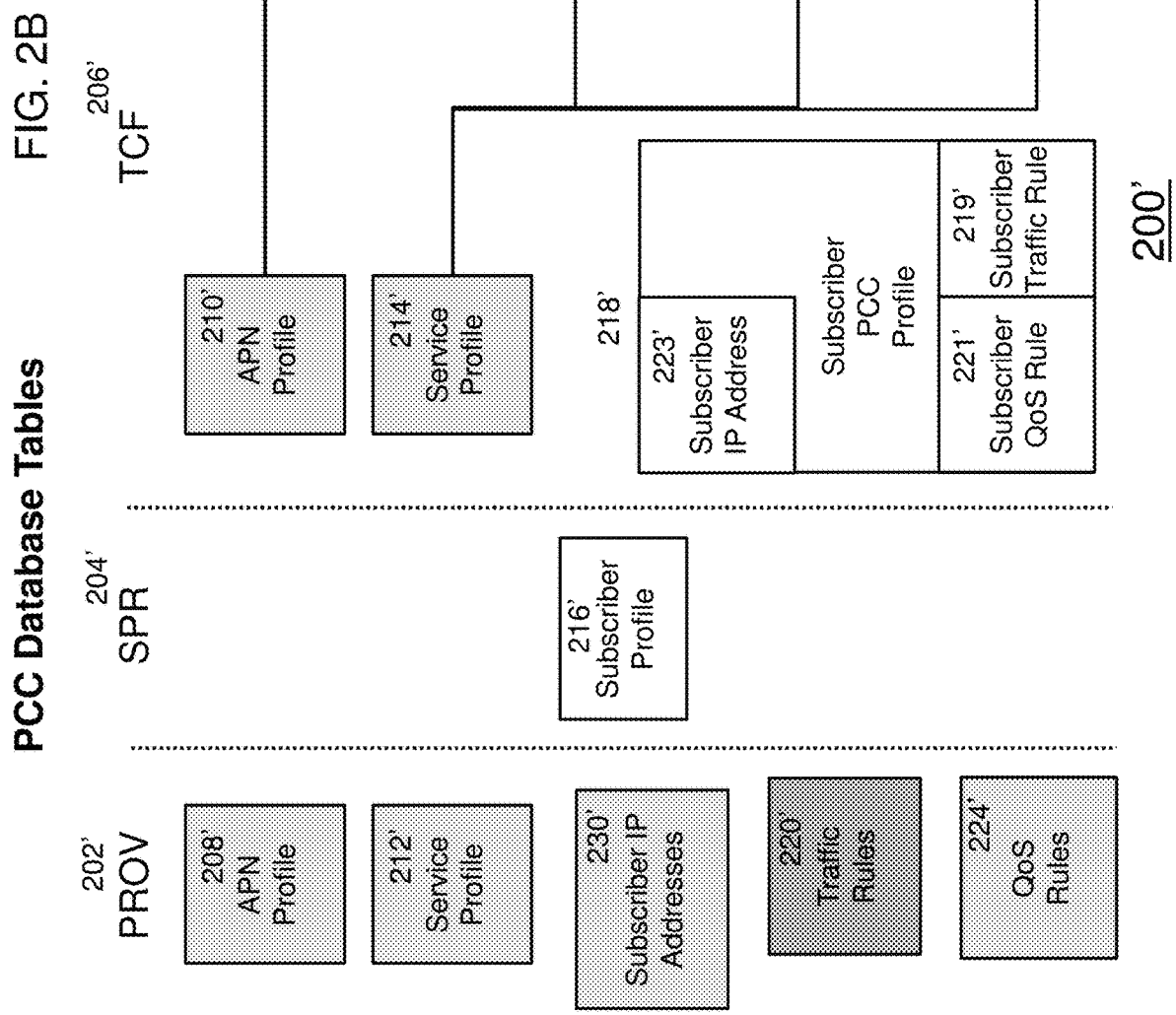
FIG. 2B illustrates an exemplary system 200' and process for automated traffic flow control using domain name for one or more devices enabled for connectivity in accordance with one or more embodiments of the present invention.

FIG. 2B illustrates an exemplary system and process 200" for automated traffic flow control using domain name for one or more devices enabled for connectivity over cellular or wireless network in accordance with an embodiment of the present invention. In an embodiment, traffic filtering/control function (TCF), for example, Aeris Packet Function (APF) 206' may combine several data entities to enforce traffic policy for any given subscriber. These data entities may include any one or more of: a profile 210' specific to an Access Point Name (APN), a profile 214' specific to a service profile, a profile 218' specific to an individual subscriber, a traffic rule 222' which defines the policy, and a QoS rule 226' which defines the quality of service aspects of the policy. These entities may be stored as part of the TCF 206', for example, APF, which enforces the traffic rule/s.

When the APF 206' selects a rule to enforce for a given subscriber, it determines whether the subscriber is associated with a service profile 214' or an individual subscriber PCC profile 218' by checking the IP address of the traffic against the subscriber IP addresses 231' or subscriber IP address 223'. The subscriber IP addresses 231' may represent all subscribers provisioned against a service profile; whereas the subscriber IP address 223' may single out a subscriber. For example, if the network operator needs to isolate a single device (for example, to test a traffic rule before applying it to a larger number of devices), the network operator has two options: create a service profile and provision only one subscriber against that service profile, or create a subscriber PCC profile for a single subscriber already provisioned against some other service profile. The latter is a bit cleaner.

If there exists a subscriber PCC profile 218' for that subscriber, the APF 206' uses the subscriber traffic rule 219' and QoS rule 221' associated with the Subscriber PCC Profile 218'. If there is no such subscriber PCC profile, the APF 206' examines the service profile 214' associated with the subscriber. If the service profile 214' does not have an assigned traffic rule 222', the APF 206' examines the APN profile 210' associated with the APN the subscriber is using and enforces the traffic rule 222' associated with that APN profile 210'. This arrangement of data elements allows the operator of the APF 206' to assign traffic rules with different specificities to enable, for example, the testing of a new traffic rule against a single subscriber before applying the traffic rule to many subscribers provisioned against a service profile.

For the purposes of filtering traffic, the combination of traffic rule 222' or subscriber traffic rule 219' and QoS Rule 226' or subscriber QoS Rule 221' form the equivalent of a PCC service profile 220 as illustrated in FIG. 2A. Data elements within the traffic rule 222' or subscriber traffic rule 219' can represent what actions to take on packets based on attributes of the packets (e.g., destination IP address or protocol), and the QoS rule 226' or subscriber QoS rule 221' defines what quality of service to apply to the packets.

Although the above embodiments are described using Aeris Packet Function (APF), a traffic control function (TCF) providing similar functionality may be used and would be within the scope of the invention. Although a number of examples of associating a traffic policy or quality of service with a subscriber are provided herein, various other associative factors may be used to determine what traffic rule should be enforced for a particular subscriber and would be within the scope of the invention.

Figure 3A:
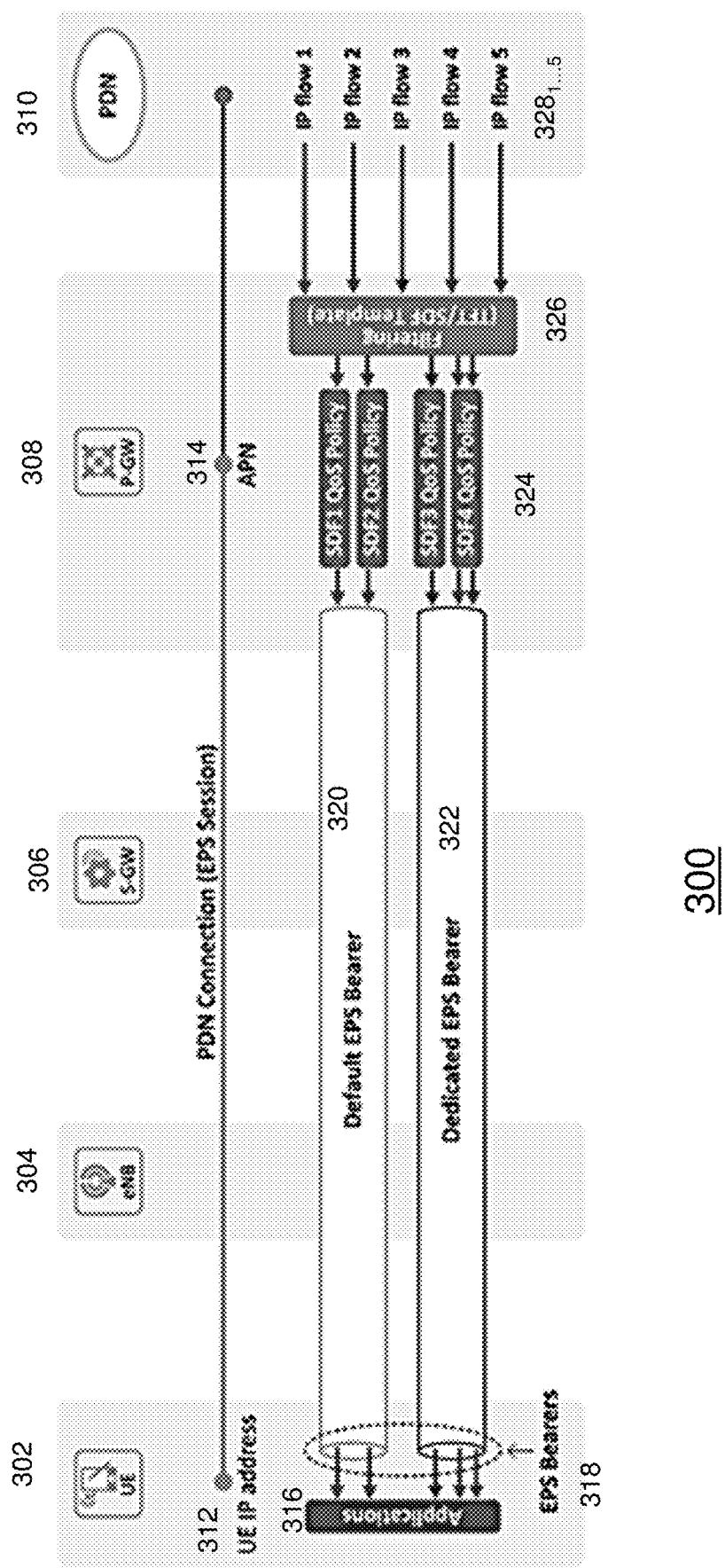
FIG. 3A illustrates an exemplary system 300 and process for automated traffic flow control using domain name for one or more devices enabled for connectivity over cellular or wireless network in accordance with an embodiment of the present invention.

FIG. 3A illustrates an exemplary system and process 300 for automated traffic flow control using domain name for one or more devices enabled for connectivity over cellular or wireless network in accordance with an embodiment of the present invention. In an embodiment, traffic is matched for categorization, assigned a Quality of Service policy 324, and delivered to a User Equipment 302 via an EPS bearer 318.

Figure 3B:
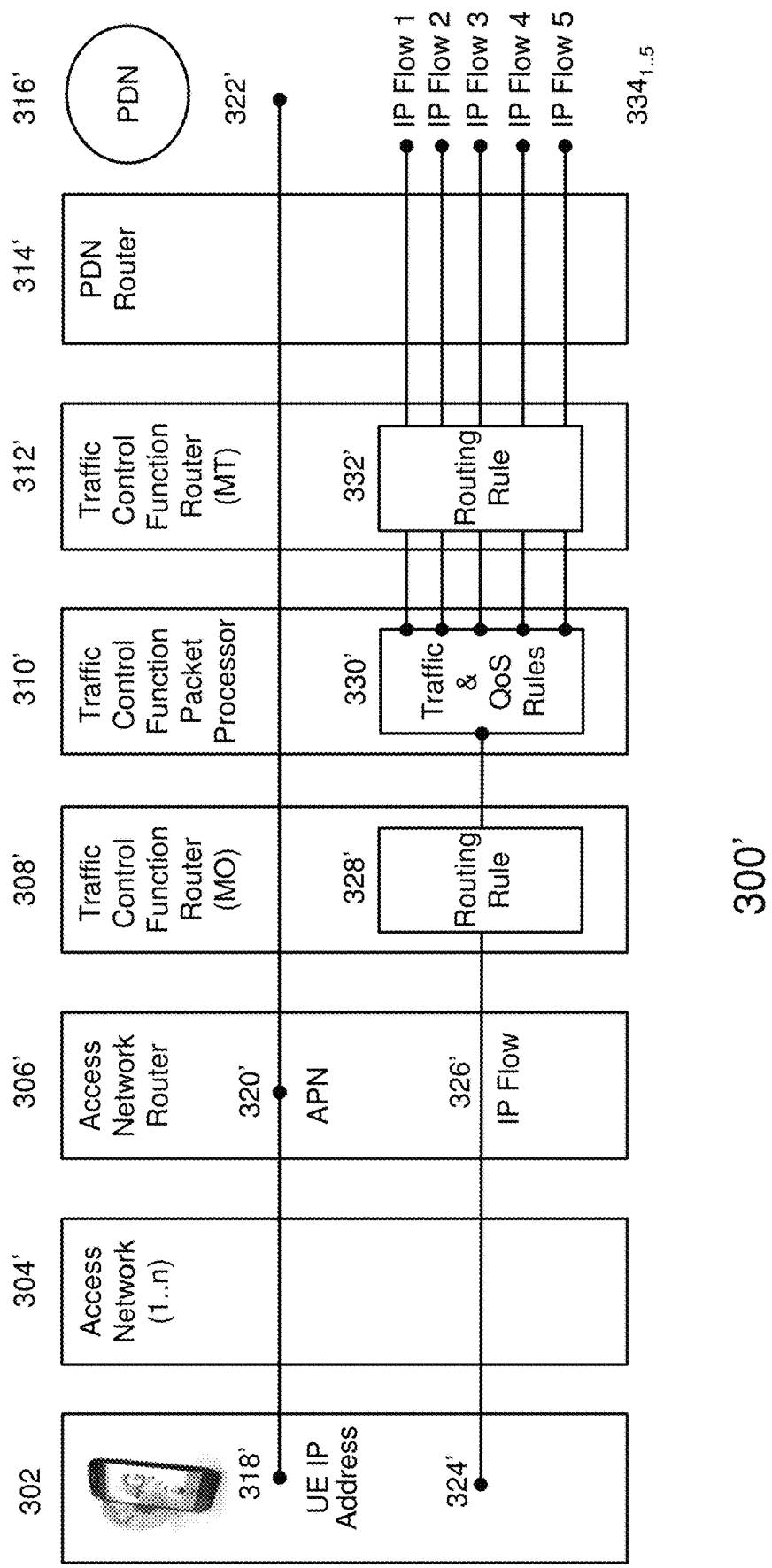
FIG. 3B illustrates an exemplary system 300' and process for automated traffic flow control using domain name for one or more devices enabled for connectivity in accordance with one or more embodiments of the present invention.

FIG. 3B illustrates an exemplary system and process 300' for automated traffic flow control using domain name for one or more devices enabled for connectivity over an access network in accordance with an embodiment of the present invention. In this embodiment, a User Equipment (UE) 302 connects to an access network 304' using an Access Point Name (APN) 320' and is assigned a UE IP address 318'. The access network 304' is not constrained to be a 3G or 4G cellular network; it may be any network which provides IP services, including, but not limited to, a 5G cellular network, an Ethernet network, or a WiFi network. The Access Point Name (APN) 320' may or may not follow the 3GPP usage of an Access Point Name (APN); within the TCF, for example, Aeris Packet Function (APF), the Access Point Name (APN) serves to differentiate UE IP addresses in order to provide, for example, differentiated services.

When the UE 302 sends an IP packet through the access network 304', the packet traverses the Access Network Router 306' which directs the packet to an APF router for mobile-originated packets 308' for the Access Point Name (APN) 320' which, based on the routing rules 328', directs the packet to the traffic rule schema translator, for example an APF packet processor 310' which applies the traffic and QoS rules 330' appropriate to the User Equipment (UE) 302.

When a packet is sent from the packet data network (PDN) 316' to the UE 302, the packet traverses the PDN router 314' which directs the packet to an APF router for mobile-terminated packets 312' which, based on the routing rules 332', directs the packet to an APF packet processor 310' which applies the traffic and QoS rules 330' appropriate to the User Equipment 302. In this manner, the Aeris Packet Function performs the same traffic filtering functions as a Policy and Charging Enforcement Function (PCEF) which may be embedded in the packet gateway (P-GW) 308 of FIG. 3A.

Although the above embodiments are described using Aeris Packet Function (APF), a traffic control function (TCF) providing similar functionality may be used and would be within the scope of the invention.

Figure 3C:
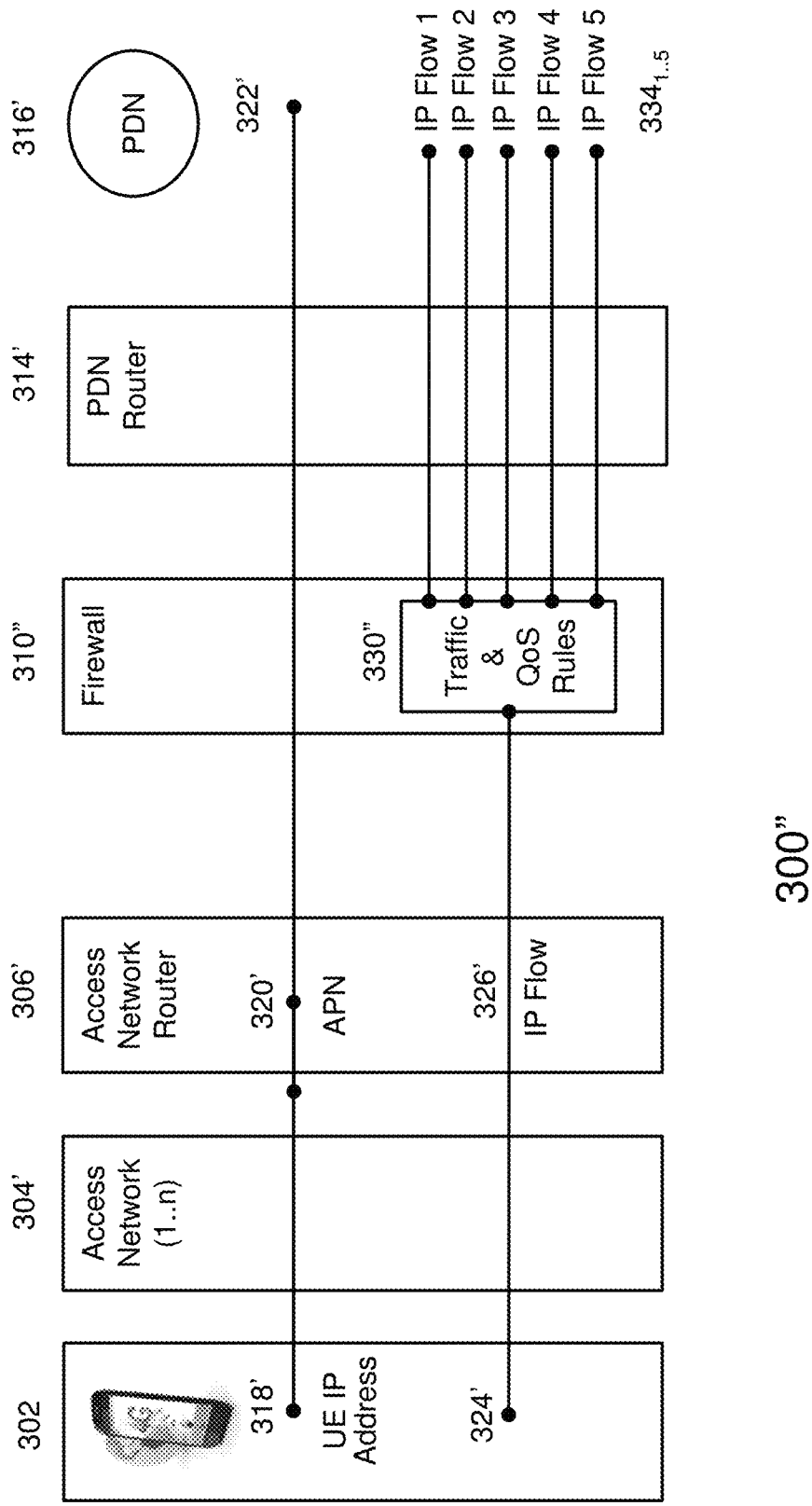
FIG. 3C illustrates an exemplary system 300" and process for automated traffic flow control using domain name for one or more devices enabled for connectivity in accordance with one or more embodiments of the present invention.

FIG. 3C illustrates an exemplary system and process 300" for automated traffic flow control using domain name for one or more devices enabled for connectivity over an access network in accordance with an embodiment of the present invention. In this embodiment, traffic control or filtering is implemented by a firewall 310" which is configured with rules 330" which define the policy for individual User Equipments (UEs) or groups of User Equipments (UEs) based on the UE IP Addresses. Similar to FIG. 3B, the access network 304' is not constrained to be a 3G or 4G cellular network; it may be any network which provides IP services, including, but not limited to, a 5G cellular network, an Ethernet network, or a WiFi network.

FIG. 4A illustrates an exemplary system and process 400 for automated traffic flow control using domain name for one or more devices enabled for connectivity over cellular or wireless network in accordance with an embodiment of the present invention.

As illustrated in FIG. 4A, packet data originates from subscribers in an E-UTRAN 402 or UTRAN 426 cellular network, passes through a Serving Gateway (SGW) 406 and Packet Gateway (PGW) 408 (LTE networks) or Service GPRS Support Node (SGSN) 422 and Gateway GPRS Support Node (GGSN) 420 (GSM and WCDMA networks) on its way to a Packet Distribution Network (PDN) 412, and are analyzed by a Packet Data Analyzer (428), which can monitor the packet data from the subscribers by, for example, port mirroring on the network between the PGW 408, GGSN 420, and PDN 412 via step (1). The packet data is also monitored by the Policy and Charging Enforcement Function (PCEF) 430, which is commonly implemented as a sub-module of the PGW 408 (LTE networks) or GGSN 420 (GSM and WCDMA networks), for compliance against installed policy and charging rules.

When the Packet Data Analyzer (PDA) 428 detects a Domain Name System (DNS) request and response for a particular cellular subscriber, the Packet Data Analyzer (PDA) 428 can notify the Policy and Charging Rule Function (PCRF) 416 about the mapping of domain name to IP address via step (3), and the PCRF 416 can notify the PCEF 430 via step (4) of updated policy and charging rules to allow or disallow packet data to or from the IP addresses found in the DNS response. The additional entities Online Charging System (OCS) 410, GSM Service Control Function (gsmSCF) 424, and Offline Charging System (OfCS) 418 are illustrated for reference only. Step (5) is provided to illustrate traffic of cellular subscribers that is not DNS requests to or responses from the network operator's DNS server 427, not shown here as the PDA 428 would capture the DNS requests to any DNS server.

The packet data analyzer (PDA) 428 may be installed in and/or work in concert with PCRF 416 or packet data gateway (PGW) 408 (LTE networks) or GGSN 420 (GSM and WCDMA networks).

To enable traffic control through use of a domain name, the service profile of a device stored in the PCRF 416 can list either the domain name, the numeric IP address associated with that device, or both, of the destination; the PCRF 416 would apply the rules for allowing or blocking traffic using the actual IP address following the 3GPP technical spec. 29.212. If the domain name is stored in the service profile but the numeric IP address is not, the PCRF can perform its own DNS query to resolve the domain name to a numeric IP address. The specific numeric IP addresses associated with domain names frequently change, however, which could result in unsuccessful connection attempts if the IP address associated with a host name in the PCRF 416 (and, by virtue of the rule installation procedure, the PCEF 430) is no longer correct. The embodiments presented by this invention can ensure that the specific numeric IP address or addresses associated with domain names are kept up-to-date.

Therefore, as illustrated by FIG. 4A, the packet data analyzer is "wiretapping" the network link(s) that carry the DNS requests and responses.

In an embodiment, illustrated by FIG. 4B and described below, the packet data analyzer is part of the system, for example, the network operator's DNS sever(s), that receives DNS requests from subscribers and sends DNS responses back to subscribers. Thus, the difference between FIG. 4A and FIG. 4B is in where the packet data analyzer is in relation to the DNS requests and responses.

FIG. 4B illustrates an exemplary system 400' and process for automated traffic flow control using domain name for one or more devices enabled for connectivity over cellular or wireless network in accordance with an embodiment of the present invention.

As illustrated in FIG. 4B, in an embodiment, the system 400' may include the protocol data analyzer 428' as a packet data analyzer (PDA) or as a DNS request and response analyzer (DRRA), as a subcomponent of the DNS server 427' operated by the network operator. DNS queries from cellular devices are directed to the DNS server 427' by the network operator via step (1'). The DNS server 427' will answer the DNS query, for example, by sending a query to the appropriate authoritative name server via (2'), and once the DNS server 427' receives the answer, the DNS server 427' will invoke the protocol data analyzer 428' with the response. Methods for invoking the protocol data analyzer 428' may include, but are not limited to, calling a function or placing a message on a message bus. The information received by the protocol data analyzer 428' may include but not limited to packet data and/or computer readable representations of DNS requests and responses, for example, a C struct, a Java object etc., although other implementations achieving the similar functionality may also be used and would be within the scope of the invention.

The protocol data analyzer 428' will send updates to the IP addresses of domain names to the PCRF 416' via step (3'). The PCRF 416' will then update charging rules installed in the PCEF 430' with the updated IP addresses via step (4'). This is different from FIG. 4A in that the protocol data analyzer 428' does not monitor and parse network traffic directly in order to monitor the mapping of domain name to IP address, but instead is given that information by the DNS server 427', which needs to be able to parse DNS requests and responses as a matter of its functionality. Step (5') is provided to illustrate traffic of cellular subscribers that is not DNS requests to or responses from the network operator's DNS server 427'.

In an embodiment, as illustrated in FIG. 4C, a protocol/packet data analyzer (PDA) or a DNS request and response analyzer may be replaced by a DNS refresher 440 component. The DNS refresher 440 component retrieves the set of domain names associated with the service profiles from the PCRF 416' and may be notified of new or removed domain names through, for example, a database trigger. This is step (3') in the figure, which may happen independently of the other steps. The DNS refresher 440 detects changes in the mapping of domain name to IP address by periodically sending DNS queries to DNS servers (for example, those indicated by 427') for those domain names via step (3"). Step (2') is included to illustrate that the DNS server 427' may forward DNS queries to authoritative DNS servers on other networks. When the DNS refresher 440 detects a change, it sends updates to the IP addresses of domain names to the PCRF 416' via step (3'''). As illustrated in FIG. 4C, the DNS server may be a physical server or a cloud server. Advantages of this embodiment include, but are not limited to, reduced opportunities for spoofed DNS responses to be treated as authoritative, avoiding the need to decrypt DNS-over-TLS/DNS-over-HTTPS requests and responses, and reducing the quantity of information sent from the protocol/packet data analyzer.

If the DNS records for a particular domain name received by a cellular device are disjoint from the DNS records for the same domain received by the DNS Refresher 440; and if that domain name is supposed to be on an allow-list, only the IP addresses known to the DNS Refresher 440 will be given to the PCRF 416' in order to include them in the charging rules sent to the PCEF 430'. This may be addressed by using the embodiments illustrated in FIGS. 4A and 4B and described in detail in the description accompanying FIGS. 4A and 4B. For example, the protocol data analyzer (PDA) may receive the DNS response that is seen by the device and can ensure that the mapping of domain name to IP address that the device learns is the same as the one that the traffic rules schema translator enforces.

In another embodiment, as illustrated in FIG. 4D, the TCF PCC 416''', for example, APF PCC, represents a controller entity such as a traffic rule schema translator which coordinates enforcement of Policy and Charging Control rules among APF packet processor 430''' instances and coordination of routing rules among APF router 408''' instances. An exemplary implementation of the APF PCC 416''' may include a user interface to allow administrators to configure the Policy and Charging Control rules and a database to store the Policy and Charging Control rules. In this manner, the APF PCC 416''' may fulfil the same function as the PCRF 416 from FIG. 4A.

As illustrated in FIG. 4D, packets from User Equipments (UEs) may enter the TCF, for example, Aeris Packet Function (APF) from either a cellular network or a wireline network where they are forwarded from an APF router 408''' to an APF packet processor 430'''. DNS queries may be directed to the DNS server of the network operator via step (1') or some other DNS server via step (1"). As illustrated in FIG. 4D, the DNS server 427' may be a physical server or a cloud server. The PDA 428''' or DNS refresher 440 detects changes in the mapping of domain name to IP address by either examining the DNS requests and responses of User Equipments (UEs) as illustrated in FIG. 4A, by integrating with the network operator's DNS server as illustrated in FIG. 4B, or by periodically sending DNS queries to DNS servers for those domain names. In this manner, the PDA 428''' may only be integrated as a sub-component of the DNS server 427' if the method of detecting changes in the mapping of domain name to IP address as per FIG. 4B is used; the DNS refresher 440 does necessarily need to be a sub-component of the DNS server 427'. The DNS Refresher 440 may discover the domain names for which it is supposed to determine the mapping of domain name to IP address by interacting with the TPF PCC 416''' through, for example, a database trigger. This is step (13) in the figure, which may happen independently of the other steps. When the DNS Refresher 440 detects a change in the mapping of domain name to IP address, it notifies the TPF PCC 416''' via step (3'). Steps 2' and 3' proceed as in FIG. 4B, though step 4''' may not necessarily use the 3GPP Gx protocol to communicate the updated Policy and Charging Control (PCC) rules to the APF packet processor 430'''. Thus, the difference between FIG. 4B and FIG. 4D is an alternative implementation of the traffic filtering function using different telecommunication protocol.

Although the above embodiments are described using Aeris Packet Function (APF), a traffic control function (TCF) providing similar functionality may be used and would be within the scope of the invention.

In another embodiment, as illustrated in FIG. 4E, a firewall 430'''' takes the place of the TCF router, for example, APF router, and a traffic rule schema translator such as TCF packet processor, for example, APF Packet Processor illustrated in FIG. 4D. In Step (4''''), a Traffic rule schema translator, for example, a Firewall controller 432'''' reads updates of service profiles from the PCC database 416" (for example, though a message bus) and updates the appropriate configuration of the firewall 430'''' using, for example, configuration commands sent over an SSH connection. Thus, the difference between FIG. 4E and FIG. 4B is an alternative implementation of the traffic filtering function using a firewall instead of TCF.

FIG. 5A illustrates an exemplary system and process 500 for automated traffic flow control using domain name for one or more devices enabled for connectivity over cellular or wireless network in accordance with an embodiment of the present invention. In this exemplary system, a customer of a cellular network service provider uses their administration system 512 (which could be human administrators aided by, for example, a computer program) to transfer traffic rules 514 to the Internet-Facing Management System 516, which could be, for example, a REST API. This is illustrated by step (1) in the FIG. 5A.

The Internet-Facing Management System transfers the customer traffic rules to the Internal Provisioning System 518, via step (2) which verifies and adjusts the customer traffic rules according to the policies of the cellular network service provider and stores the adjusted and verified traffic policy 520 into a data storage mechanism for Policy and Charging Control (PCC) 522. This is step (3) in the figure.

Additionally, the customer of the cellular network service provider may request the Internet-Facing Management to associate or provision one or more of the customer's cellular subscribers with the customer traffic rules; this association is stored in the a data storage mechanism, the Subscriber Profile Registry (SPR) 524. These steps comprise the "policy provisioning phase" of the exemplary system.

When a cellular subscriber 502 of the customer establishes a packet data session on a cellular network (including, but not limited to, an eNodeB 504 and Serving Gateway (SGW) 506), the Policy and Charging Enforcement Function (PCEF) 509 of the Packet Gateway (PGW) 508 of the cellular network service provider communicates with the Policy and Charging Rule Function (PCRF) 528 of the cellular network service provider by sending a Credit-Control Request 530 message containing, but not limited to, the International Mobile Subscriber Identifier 532 of the cellular subscriber. This is step (4) in the figure.

The PCRF 528 retrieves the subscriber's traffic policy 526 from the PCC 522 and SPR 524 data storage mechanisms. This is step (5) in the figure. The PCRF 528 then uses the subscriber's traffic policy to construct a Credit-Control Answer (CCA) message 534, which contains a set of PCC- Rules (536) representing the subscriber's traffic policy 526, and sends the CCA 534 back to the PGW 508. This is step (6) in the figure.

Once the subscriber's data session is established, the PCEF 509 as part of the PGW 508 will enforce the subscriber's traffic policy on packets that pass between the subscriber and the Packet Distribution Network 510. The PCC-Rules provided by the PCRF 528 to the PGW 508 in the CCA 536 are said to be "installed" in the PGW 508. These steps comprise the "device attachment phase" of the exemplary system.

As illustrated in FIG. 5A, in an embodiment, the packet data analyzer (PDA) 537 of system 500 may passively listen (for example, using a span port on a router) to DNS queries and responses (DNS traffic) of cellular subscribers 502 as the DNS traffic is routed from the PGW 508 and Packet Data Network 510. This is step (7) in the figure. Upon discovery that a monitored domain name has changed IP address or IP addresses, the packet data analyzer updates the records in the PCC database 522. This is step (8) in the figure. The PCRF 528 may be notified of this update (for example, through a database trigger or message bus). This is step (9) in the figure. The PCRF 528 may send a Re-Auth-Request (RAR) message 538 to the PGW containing any revised PCC rules 539. This is step (10) in the figure. These steps form the "device in service phase" of the exemplary system.

In another embodiment, as illustrated in FIG. 5B, a sniffer or a packet data analyzer (PDA) 537' may be installed, for example, in PCRF 528', which is an environment controlled by the network provider. As illustrated in FIG. 5B, the DNS requests and responses may be forwarded to the PDA via a network element NE 540, for example, a span port and a firewall rule or a span port and a packet capture tool such as tcpdump etc., where PDA 537' analyzes the DNS traffic to monitor changes in IP address or IP addresses for the domain name. All the other components and their working is the same as illustrated in FIG. 5A and described in the description accompanying FIG. 5A. Thus, the packet data analyzer (PDA) 537' may be installed in and/or work in concert with PCRF 528' as illustrated in FIG. 5B or PGW 508 (LTE networks) or GGSN (GSM and WCDMA networks) as illustrated in FIG. 5A.

To enable traffic control through use of a domain name, the service profile of a device stored in the PCRF 528' can list either the domain name, the numeric IP address, or both of the destination to be allowed or denied for that device; the PCRF 528' would apply the rules for allowing or blocking traffic using the actual IP address following the 3GPP technical spec. 29.212. If the domain name is stored in the service profile but the numeric IP address is not, the PCRF can perform its own DNS query to resolve the domain name to a numeric IP address. The specific numeric IP addresses associated with domain names frequently change, however, which could result in unsuccessful connection attempts if the IP address associated with a host name in the PCRF 528' (and, by virtue of the rule installation procedure in steps 4, 5, and 6, the PCEF 509') is no longer correct. The embodiments presented by this invention can ensure that the specific numeric IP address associated with domain names are kept up-to-date.

In another embodiment, as illustrated in FIG. 5C, steps (1) through (6) take place as per FIG. 5B. A PDA 537 or a DNS refresher 540 may retrieve the list of domain names from the PCC database 522 via, for example, a database trigger. This is illustrated by step (13) in FIG. 5C, which may happen independently of the other steps. The PDA 537 or the DNS refresher 540 detects changes in the mapping of domain name to IP address by either examining DNS the requests and responses of User Equipments (UEs) as illustrated in FIG. 5A as per step (7), by integrating with the network operator's PCRF component as illustrated in FIG. 5B as per step (7), or by periodically sending DNS queries to DNS servers 542 for those domain names, illustrated by step (7'). The DNS refresher 540 may be provided as part of protocol data analyzer or as a separate functional component as illustrated in FIG. 5C.

Upon discovery that a monitored domain name has changed IP address or IP addresses, the DNS refresher 540 updates the records in the PCC database 522 illustrated by step (10). The PCRF 528 may be notified of this update (for example, through a database trigger or message bus) illustrated by step (11). The PCRF 528 may send a Re-Auth-Request (RAR) message 538 to the PGW containing any revised PCC rules 539 illustrated by step (12). In this manner, the specific numeric IP addresses associated with domain names are kept up-to-date.

In another embodiment, as illustrated in FIG. 5D, the TCF packet processor 528''', for example, APF packet processor, takes the place of the PCRF 528 and PCEF 509, and the TCF access network router 508''', for example, APF access network router, and TCF PDN router 509'''', for example, APF PDN router, takes the place of the PGW/GGSN 508. When a service profile is created, updated, or deleted in the PCC data storage mechanism 522, the APF packet processor 528''' is notified (for example, via a database trigger), and the APF packet processor 528''' updates its internal traffic filtering and control rules to match illustrated by step (4).

IP packets 530''' from cellular subscribers 502 are routed to the APF packet processor 528'' from the access network router 506'' and the APF access network router 508'''; the APF packet processor 528''' enforces Policy and Charging Rules as specified by the subscribed traffic policy 526. Packets 536''' that the APF packet processor 528D allows to pass are forwarded towards their destination on the PDN 510 through the APF PDN router 509'''.

The process of the APF access network router 508''' sending packets to the APF Packet Processor 528''' so that the APF packet processor 528D may enforce the subscribed traffic policy 526 is given by step (5). If the APF packet processor 528''' accepts the packet, the packet is sent via step (6) towards the packet's destination on the PDN 510. If the APF packet processor 528''' drops the packet, the packet will not be sent per step (6). When a packet data analyzer 537 or the DNS refresher 540 discovers (via step (7), similar to step (7) or steps (7') and (10) in FIG. 5C) that a monitored domain name has changed IP addresses, the protocol/packet data analyzer 537 updates the records in the PCC database 522 as illustrated by step (8) or step (8'). The DNS refresher 540 may be provided as part of protocol data analyzer or as a separate functional component as illustrated in FIG. 5D. The DNS refresher 540 may retrieve domain names from the PCC data storage mechanism 522 through, for example, a database trigger. This is step (13) in the figure, which may happen independently of the other steps.

The APF packet processor 528''' may be notified of this update (for example, through a database trigger or message bus) illustrated by step (9). This update causes the APF packet processor 528''' to modify the Policy and Charging Control (PCC) rules it is enforcing, ensuring that the specific numeric IP address associated with domain names are kept up-to-date.

Although the above embodiments are described using Aeris Packet Function (APF), a traffic control function (TCF) providing similar functionality may be used and would be within the scope of the invention.

In another embodiment, as illustrated in FIG. 5E, a firewall 508"" may replace the TCF functional components described herein as APF functional components. For example, the APF routers 508" and 509" and packet processor 528" of FIG. 5C are replaced with a firewall controller 528"". When a service profile is modified, updated, or deleted in the PCC data storage mechanism, the firewall controller 528"" is notified (for example, through a message bus). This is illustrated by step (4). When the firewall controller 528"" is notified in this manner, the firewall controller 528"" updates the corresponding configuration of the firewall 508"" through, for example, a series of commands sent over an SSH connection. This is illustrated by step (5). When a User Equipment (UE) 502 sends an IP packet through the access network 504, which may be, but is not limited to, a cellular, wired, or WiFi network, the IP packet passes through the access network router 506" and the firewall 508"". The firewall 508"" evaluates the IP packet against its configured rules and allows the packet to pass or drops the packet illustrated by step (6). Similarly, when an IP packet is sent from the PDN 510 to the UE 502, the firewall 508"" will evaluate the IP packet against its configured rules and allow the packets to pass or drops the packet. (Also step (6) in the figure.) If the IP packet is part of a DNS query or response, the protocol/packet data analyzer 537 will inspect the packet and perform steps (7) and (8) as per FIG. 5A. The DNS refresher 540 may also detect a change in the mapping of domain name to IP address by periodically querying a DNS server 542. This is step (7') in the figure. The DNS refresher 540 may be provided as part of protocol data analyzer or as a separate functional component as illustrated in FIG. 5C. The DNS refresher 540 may retrieve domain names from the PCC data storage mechanism 522 through, for example, a database trigger. This is step (13) in the figure, which may happen independently of the other steps. The firewall controller 528"" will then be notified of the updated service profile via step (9) and will update the configuration of the Firewall 508"" via step (10). In this manner, the specific numeric IP addresses associated with domain names are kept up-to-date.

Figure 6:
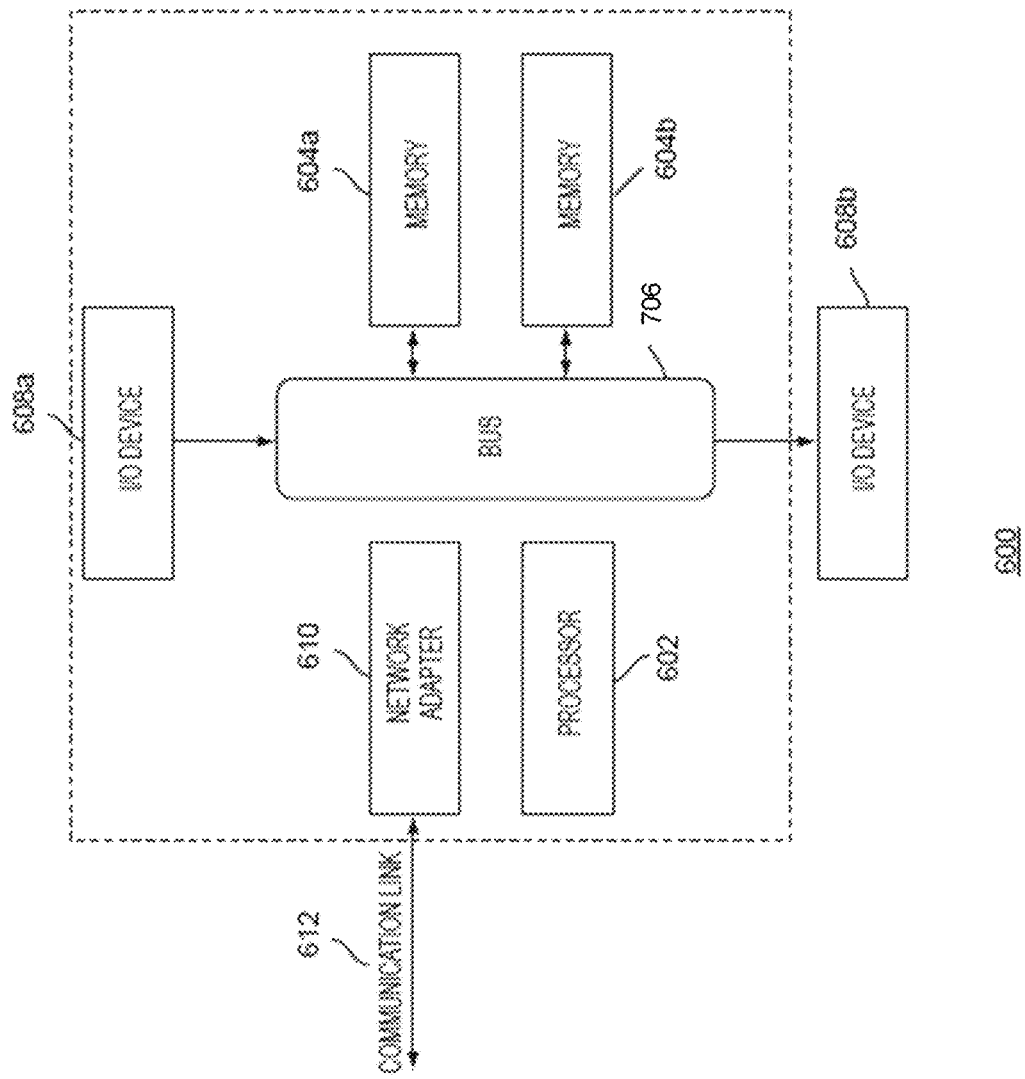
FIG. 6 illustrates a data processing system 600 suitable for storing the computer program product and/or executing program code relating to automated secure device registration and provisioning of one or more devices enabled for connectivity over cellular or wireless network in accordance with one or more embodiments of the present invention.

FIG. 6 illustrates a data processing system 600 suitable for storing the computer program product and/or executing program code in accordance with an embodiment of the present invention. The data processing system 600 includes a processor 602 coupled to memory elements 604*a-b* through a system bus 606. In an embodiment, the data processing system 600 may include more than one processor and each processor may be coupled directly or indirectly to one or more memory elements through a system bus.

Memory elements 604*a-b* can include local memory employed during actual execution of the program code, bulk storage, and cache memories that provide temporary storage of at least some program code in order to reduce the number of times the code must be retrieved from bulk storage during execution. As shown, input/output or I/O devices 608*a-b* (including, but not limited to, keyboards, displays, pointing devices, etc.) are coupled to the data processing system 600. I/O devices 608*a-b* may be coupled to the data processing system 600 directly or indirectly through intervening I/O controllers (not shown).

In FIG. 6, a network adapter 610 is coupled to the data processing system 602 to enable data processing system 602 to become coupled to other data processing systems or remote printers or storage devices through communication link 612. Communication link 612 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, 5G, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for automated traffic flow control using domain name for one or more devices enabled for connectivity comprises:
   receiving device information for the one or more devices;
   receiving domain name information for one or more domain names that the one or more devices are allowed to access, denied access or a combination thereof;
   associating each of the one or more domain names with one or more internet protocol (IP) addresses;
   associating each of the one or more devices with a service profile specifying one or more domains that are allowed or disallowed for that device;
   monitoring each of the one or more domains for change in the one or more IP addresses for that domain, wherein monitoring each of the one or more domains for change in the one or more IP addresses for that domain includes determining if there has been a change in the one or more IP addresses associated with that domain name using domain name system (DNS) look up and automatically updating the one or more IP addresses in the service profile for the one or more devices; and
   updating the one or more IP address of the domain name if any change in the IP addresses for that domain is found,
   wherein:
      a policy and charging rules function (PCRF) notifies a policy and charging rule enforcement function (PCEF) of the change in the service profile for the one or more devices in the PCRF,
      a traffic control function (TCF) policy and charging control (PCC) database notifies a traffic control function (TCF) packet processor of the change in the service profile for the one or more devices in the TCF packet processor, or
      a firewall controller notifies the firewall of the change in the service profile for the one or more devices in the firewall processor, when there is a change to the IP addresses of the domain name in the database.

2. The computer-implemented method of claim 1, wherein the device information includes one or more of: device identifier, make and model of the device and international mobile equipment identity (IMEI), International mobile subscriber identity (IMSI).

3. The computer-implemented method of claim 1, wherein the device includes one or more IoT devices enabled to connect with wireless or cellular networks with products such as Subscriber Identification Modules (SIMs) installed in them.

4. The computer-implemented method of claim 1, wherein the associating the at least one domain name with one or more internet protocol (IP) addresses includes ensuring that the association between the at least one domain name and the one or more internet protocol (IP) addresses that the one or more devices learn, is the same as the association that a traffic rules schema translator enforces.

5. The computer-implemented method of claim 1, wherein automatically updating the one or more IP addresses in the service profile for the one or more devices includes updating the service profile stored in a traffic rule schema translator.

6. The computer-implemented method of claim 5, wherein traffic rule schema translator comprises any one of: the PCRF, the TCF packet processor or firewall controller.

7. The computer-implemented method of claim 1, further comprising notifying any one of: the PCEF, traffic control function (TCF) access network router or firewall of a change in the service profile for the one or more devices in the PCRF when there is a change to the IP addresses of the domain name in the database.

8. The computer-implemented method of claim 7, further comprising enforcing the policy and charging rules sent to any one of: the PCEF by the PCRF, the TCF packet processor by the TCF policy and charging control (PCC) database or the firewall by the firewall controller.

9. The computer-implemented method of claim 1, wherein determining if there has been a change in the one or more IP addresses associated with the domain name using DNS look up includes any of: protocol data analyzer (PDA) or domain name system (DNS) refresher.

10. The computer-implemented method of claim 9, wherein the protocol data analyzer comprises any of: a packet data analyzer or a DNS request and response analyzer.

11. A system for automated traffic flow control using domain name for one or more devices enabled for connectivity over cellular network, comprising:
    one or more devices enabled for connectivity;
    a service profile associated with each of the one or more devices;
    a protocol data analyzer;
    a database; and
    any one of: a policy and charging rule enforcement function (PCEF), a traffic control function (TCF) packet processor, or a firewall,
    wherein the service profile includes: domain name information for one or more domain names that the device is allowed to access, denied to access or a combination thereof;
    wherein the protocol data analyzer:
       associates the at least one domain name with one or more internet protocol (IP) addresses,
       monitors each of the one domains for change in the one or more IP addresses for that domain, wherein the monitors each of the one or more domains for change in the one or more IP addresses for that domain includes determining if there has been a change in the one or more IP addresses associated with that domain name using domain name system (DNS) look up and automatically updating the one or more IP addresses in the service profile for the one or more devices; and
       updates the one or more IP addresses of the domain name in the database if any change in the one or more IP addresses for that domain is found; and
    wherein:
       a policy and charging rules function (PCRF) notifies the PCEF of the change in the service profile for the one or more devices in the PCRF,
       traffic control function (TCF) policy and charging control (PCC) database notifies the TCF packet processor of the change in the service profile for the one or more devices in the TCF packet processor, or
       firewall controller notifies the firewall of the change in the service profile for the one or more devices in the firewall processor, when there is a change to the IP addresses of the domain name in the database.

12. The system of claim 11, wherein the device information includes one or more of: device identifier, make and model of the device and international mobile equipment identity (IMEI), International mobile subscriber identity (IMSI).

13. The system of claim 11, wherein the device includes one or more IoT devices enabled to connect with wireless or cellular networks with products such as Subscriber Identification Modules (SIMs) installed in them.

14. The system of claim 11, wherein the automatically updating the one or more IP addresses in the service profile for the one or more devices includes updating the service profile stored in a traffic rule schema translator.

15. The system of claim 14, wherein the traffic rule schema translator comprises any one of: a policy and charging rules function (PCRF), a traffic control function (TCF) packet processor or a firewall controller.

16. The system of claim 11, wherein the protocol data analyzer (PDA) further ensures that the association between the at least one domain name and the one or more internet protocol (IP) addresses that the one or more devices learn, is the same as the association that a traffic rules schema translator enforces.

17. The system of claim 11, wherein the PCEF enforces the policy and charging rules sent to the PCEF by the PCRF, the traffic control function (TCF) packet processor enforces the policy and charging rules sent by the traffic control function (TCF) policy and charging control (PCC) database or the firewall enforces the policy and charging rules sent by the firewall controller.

18. The system of claim 11, wherein the determining if there has been a change in the one or more IP addresses associated with the domain name using the DNS look up includes any of: protocol data analyzer (PDA) or domain name system (DNS) refresher.

19. The system of claim 18, wherein the protocol data analyzer comprises any of: a packet data analyzer or a DNS request and response analyzer.

20. A non-transitory computer-readable medium storing executable instructions for automated traffic flow control that, in response to execution, cause a computer to perform operations comprising:
   receiving device information for one or more devices;
   receiving domain name information for one or more domain names that the one or more devices are allowed to access, denied to access or a combination thereof;
   associating each of the one or more domain names with one or more internet protocol (IP) addresses;
   monitoring each of the one or more domains for change in the one or more IP addresses for that domain, wherein the monitoring each of the one or more domains for change in the one or more IP addresses for that domain includes determining if there has been a change in the one or more IP addresses associated with that domain name using domain name system (DNS) look up and automatically updating the one or more IP addresses in the service profile for the one or more devices; and
   updating the one or more IP addresses of the domain name if any change in the one or more IP addresses for that domain is found,
wherein:
   a policy and charging rules function (PCRF) notifies a policy and charging rule enforcement function (PCEF) of the change in the service profile for the one or more devices in the PCRF,
   a traffic control function (TCF) policy and charging control (PCC) database notifies a traffic control function (TCF) packet processor of the change in the service profile for the one or more devices in the TCF packet processor, or
   a firewall controller notifies the firewall of the change in the service profile for the one or more devices in the firewall processor, when there is a change to the IP addresses of the domain name in the database.

21. The non-transitory computer-readable medium of claim 20, wherein the device information includes one or more of: device identifier, make and model of the device and international mobile equipment identity (IMEI), International mobile subscriber identity (IMSI).

22. The non-transitory computer-readable medium of claim 20, wherein the device includes one or more IoT devices enabled to connect with wireless or cellular networks with products such as Subscriber Identification Modules (SIMs) installed in them.

23. The non-transitory computer-readable medium of claim 20, wherein associating the at least one domain name with one or more internet protocol (IP) addresses further comprises ensuring that the association between the at least one domain name and the one or more internet protocol (IP) addresses that the one or more devices learn, is the same as the association that a traffic rules schema translator enforces.

24. The non-transitory computer-readable medium of claim 20, wherein automatically updating the one or more IP addresses in the service profile for the one or more devices includes updating the service profile stored in a traffic rule schema translator.

25. The non-transitory computer-readable medium of claim 24, wherein traffic rule schema translator comprises any one of: a policy and charging rules function (PCRF), a traffic control function (TCF) packet processor or a firewall controller.

26. The non-transitory computer-readable medium of claim 20 further comprising instructions for notifying any one of: policy and charging rule enforcement function (PCEF), traffic control function (TCF) packet processor or firewall of a change in the service profile for the one or more devices in the PCRF when there is a change to the one or more IP addresses of the domain name in the database.

27. The non-transitory computer-readable medium of claim 26 further comprising instructions for the PCEF to enforce the policy and charging rules sent to the PCEF by the PCRF, the traffic control function (TCF) packet processor by the traffic control function (TCF) policy and charging control (PCC) database or the firewall by the firewall controller.

28. The non-transitory computer-readable medium of claim 20, wherein determining if there has been a change in the one or more IP addresses associated with a domain name using domain name system (DNS) look up includes any of: protocol data analyzer (PDA) or domain name system (DNS) refresher.

29. The non-transitory computer-readable medium of claim 28, wherein the protocol data analyzer comprises any of: a packet data analyzer or a DNS request and response analyzer.

* * * * *